United States Patent
Phillips et al.

(10) Patent No.: US 10,986,390 B2
(45) Date of Patent: *Apr. 20, 2021

(54) RECORDING DEVICE AND METHOD FOR EFFICIENT NETWORK PERSONAL VIDEO RECORDER MANIPULATION THROUGH ADAPTIVE BIT RATE STREAMING

(71) Applicant: ERICSSON AB, Stockholm (SE)

(72) Inventors: Chris Phillips, Hartwell, GA (US); Jennifer Anne Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,696

(22) Filed: Mar. 25, 2020

(65) Prior Publication Data

US 2020/0228857 A1 Jul. 16, 2020

Related U.S. Application Data

(63) Continuation of application No. 15/917,580, filed on Mar. 10, 2018, now Pat. No. 10,638,184, which is a
(Continued)

(51) Int. Cl.
| | |
|---|---|
| H04N 7/173 | (2011.01) |
| H04N 21/2747 | (2011.01) |
| H04N 21/218 | (2011.01) |
| H04N 21/239 | (2011.01) |
| H04N 21/262 | (2011.01) |
| H04N 21/472 | (2011.01) |
| H04N 21/845 | (2011.01) |
| H04N 21/2343 | (2011.01) |

(Continued)

(52) U.S. Cl.
CPC ... *H04N 21/2747* (2013.01); *H04N 21/21815* (2013.01); *H04N 21/2393* (2013.01); *H04N 21/23439* (2013.01); *H04N 21/26258* (2013.01); *H04N 21/47214* (2013.01); *H04N 21/8456* (2013.01); *H04N 21/2387* (2013.01); *H04N 21/23113* (2013.01); *H04N 21/2662* (2013.01)

(58) Field of Classification Search
CPC ......... H04N 21/2747; H04N 21/21815; H04N 21/23113; H04N 21/2387; H04N 21/2662; H04N 21/2393; H04N 21/26258; H04N 21/47214; H04N 21/8456; H04N 21/23439
USPC .............................................. 725/87, 90, 92
See application file for complete search history.

(56) References Cited

U.S. PATENT DOCUMENTS

| | | |
|---|---|---|
| 9,038,116 B1 | 5/2015 | Knox et al. |
| 2006/0174289 A1 | 8/2006 | Theberge |
| (Continued) | | |

FOREIGN PATENT DOCUMENTS

| | | |
|---|---|---|
| CN | 103049567 A | 4/2013 |
| EP | 2373051 A2 | 10/2011 |
| KR | 10-2011-0076831 A | 7/2011 |

*Primary Examiner* — Pankaj Kumar
*Assistant Examiner* — Sahar Aqil Riaz

(57) ABSTRACT

A recording device and a method are described herein that provide a network-based personal video recording service utilizing adaptive bit rate technology for a plurality of users. In operation, the recording device records at a minimum a single bit rate (one set of segmented files) of the broadcast content within each user's network personal video recorder storage unit. Plus, the recording device stores the other bit rates (remaining sets of segmented files) in a central storage location or some other storage location.

29 Claims, 16 Drawing Sheets

Related U.S. Application Data continuation of application No. 14/035,665, filed on Sep. 24, 2013, now Pat. No. 9,955,203.

(51) Int. Cl.
    *H04N 21/2662*    (2011.01)
    *H04N 21/2387*    (2011.01)
    *H04N 21/231*     (2011.01)

(56) References Cited

U.S. PATENT DOCUMENTS

| | | |
|---|---|---|
| 2009/0235317 A1 | 9/2009 | Igarashi |
| 2009/0297129 A1 | 12/2009 | Jenzowsky et al. |
| 2010/0332727 A1 | 12/2010 | Kapil et al. |
| 2011/0035775 A1 | 2/2011 | Patel et al. |
| 2011/0107180 A1 | 5/2011 | Markison et al. |
| 2011/0238789 A1 | 9/2011 | Luby et al. |
| 2012/0011225 A1 | 1/2012 | Keum et al. |
| 2012/0042090 A1 | 2/2012 | Chen et al. |
| 2012/0117103 A1 | 5/2012 | Farrelly et al. |
| 2012/0117263 A1 | 5/2012 | Xu et al. |
| 2012/0290739 A1 | 11/2012 | Melnyk et al. |
| 2013/0060956 A1 | 3/2013 | Nagaraj et al. |
| 2013/0142499 A1 | 6/2013 | Major et al. |
| 2014/0010517 A1 | 1/2014 | Sheffler et al. |
| 2014/0208314 A1 | 7/2014 | Jeswani et al. |
| 2014/0219638 A1 | 8/2014 | Viveganandhan et al. |
| 2014/0230003 A1 | 8/2014 | Ma et al. |
| 2014/0237525 A1 | 8/2014 | Rothschild et al. |
| 2015/0261600 A1 | 9/2015 | Iturralde et al. |

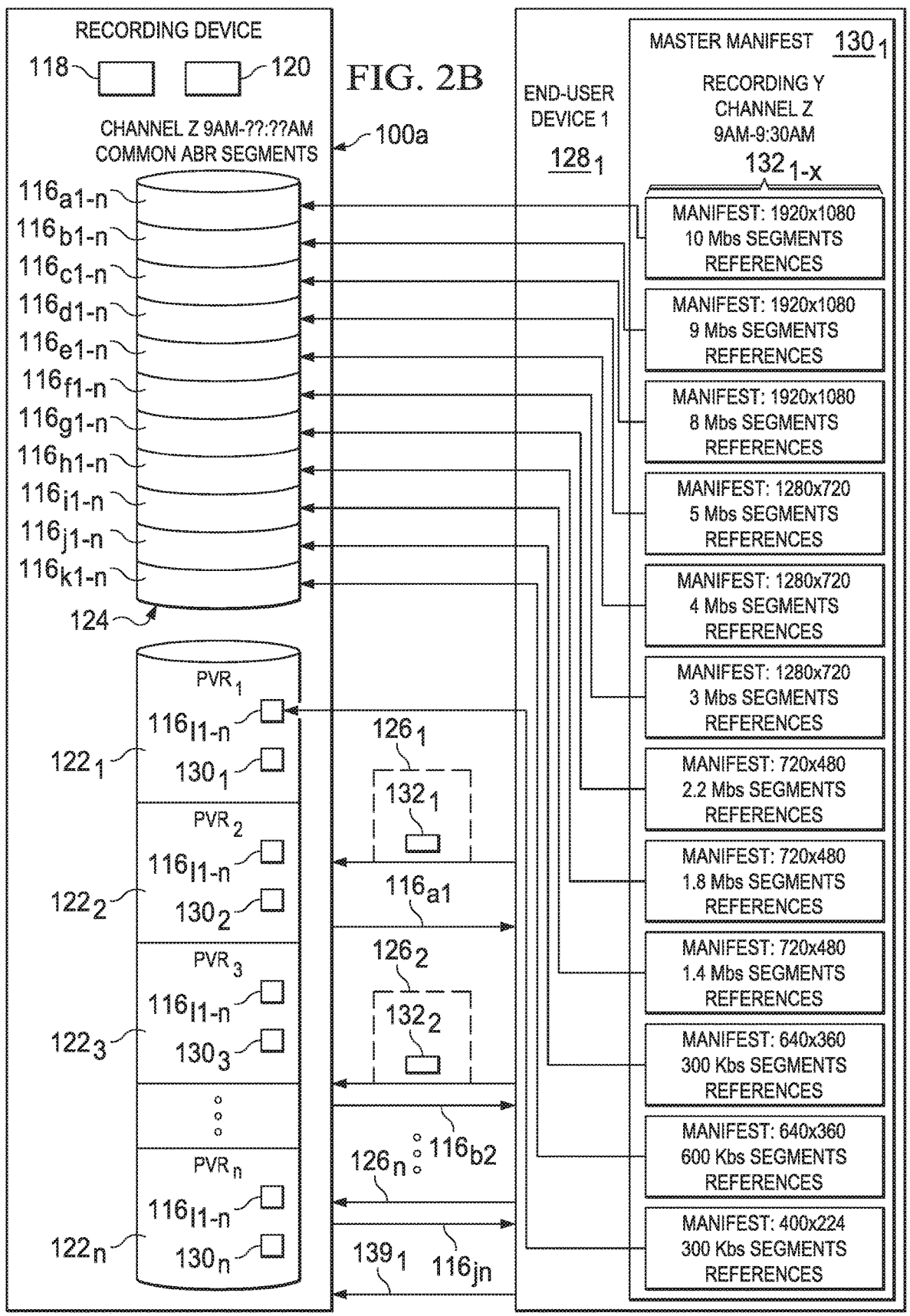

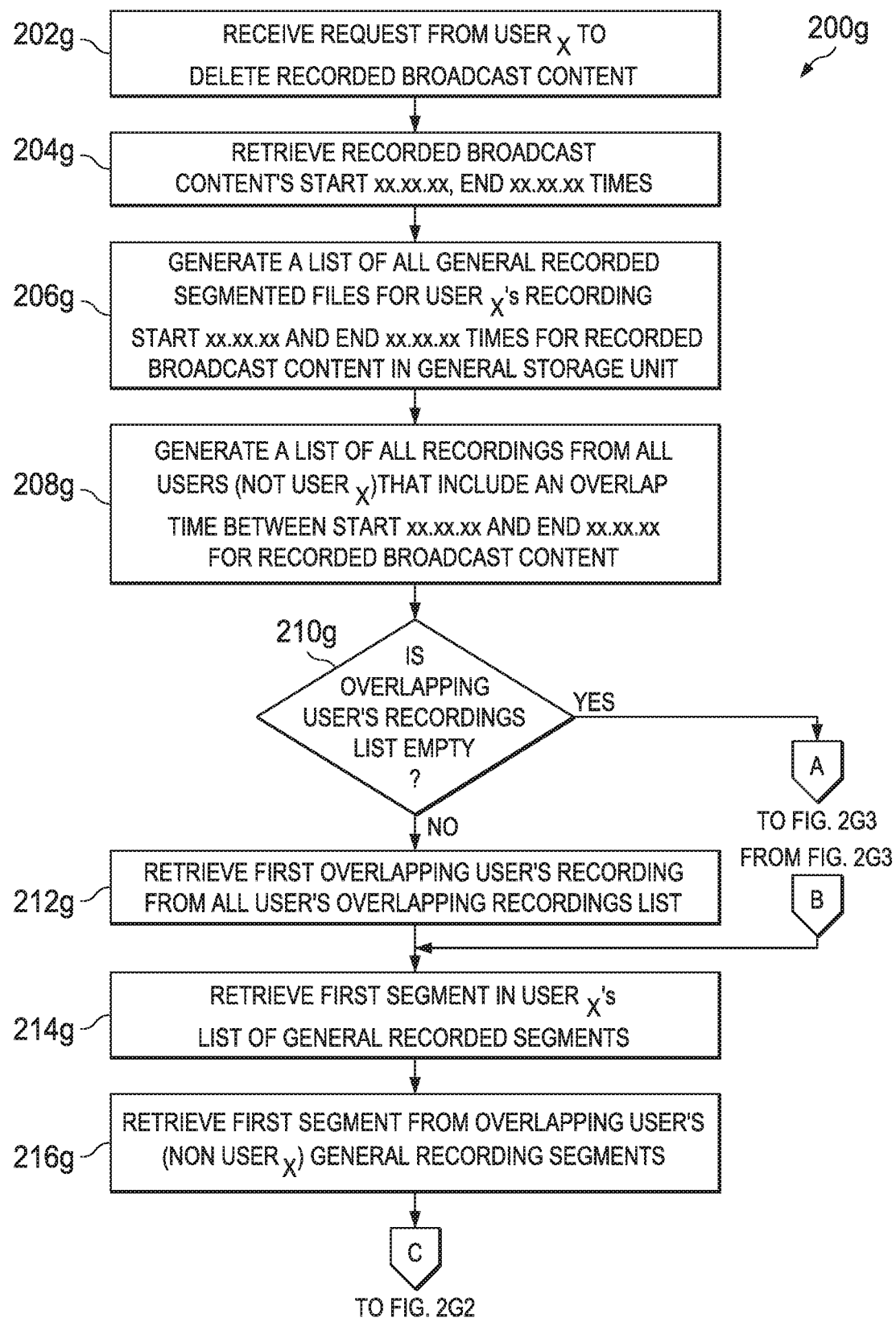
FIG. 2G1

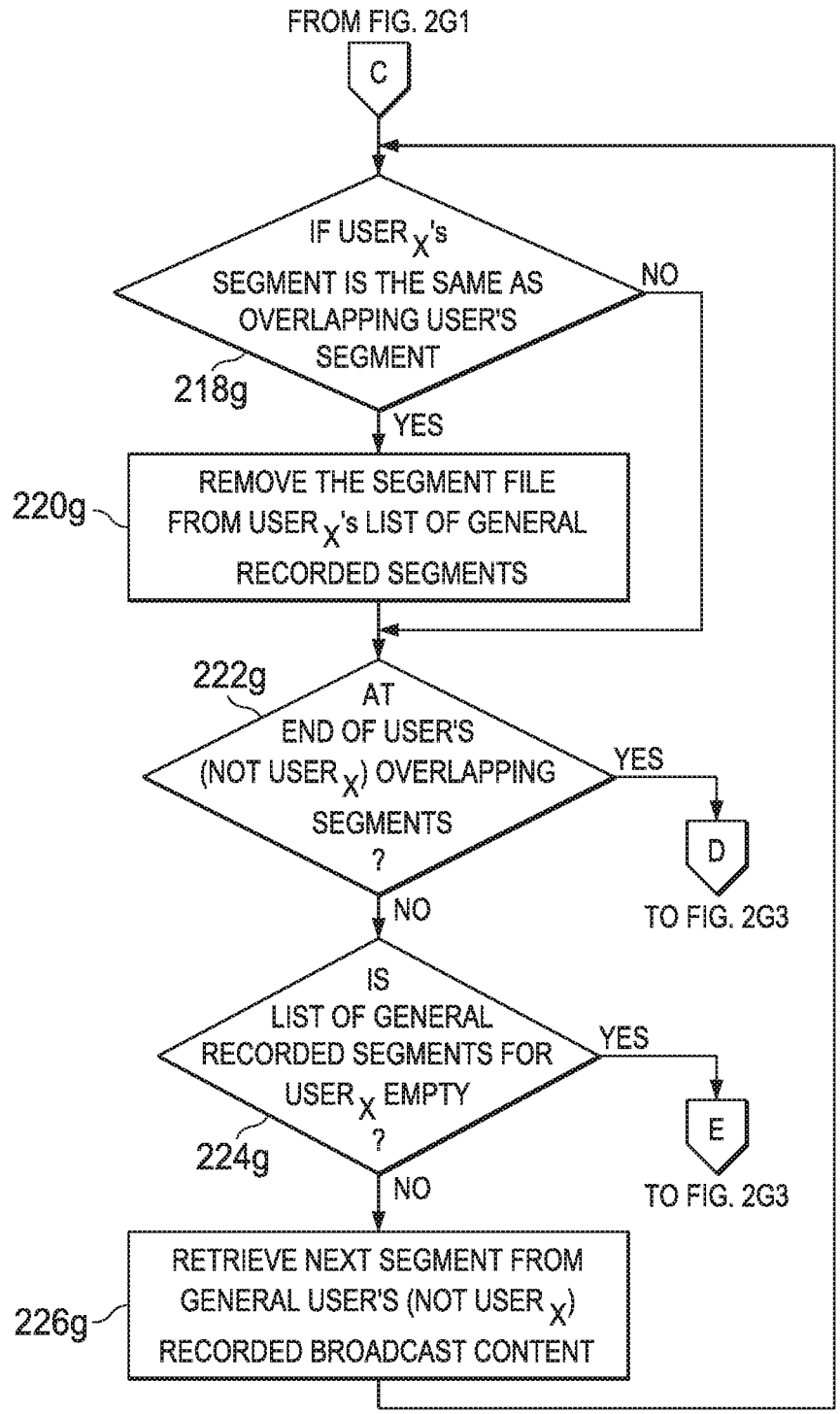
FIG. 2G2

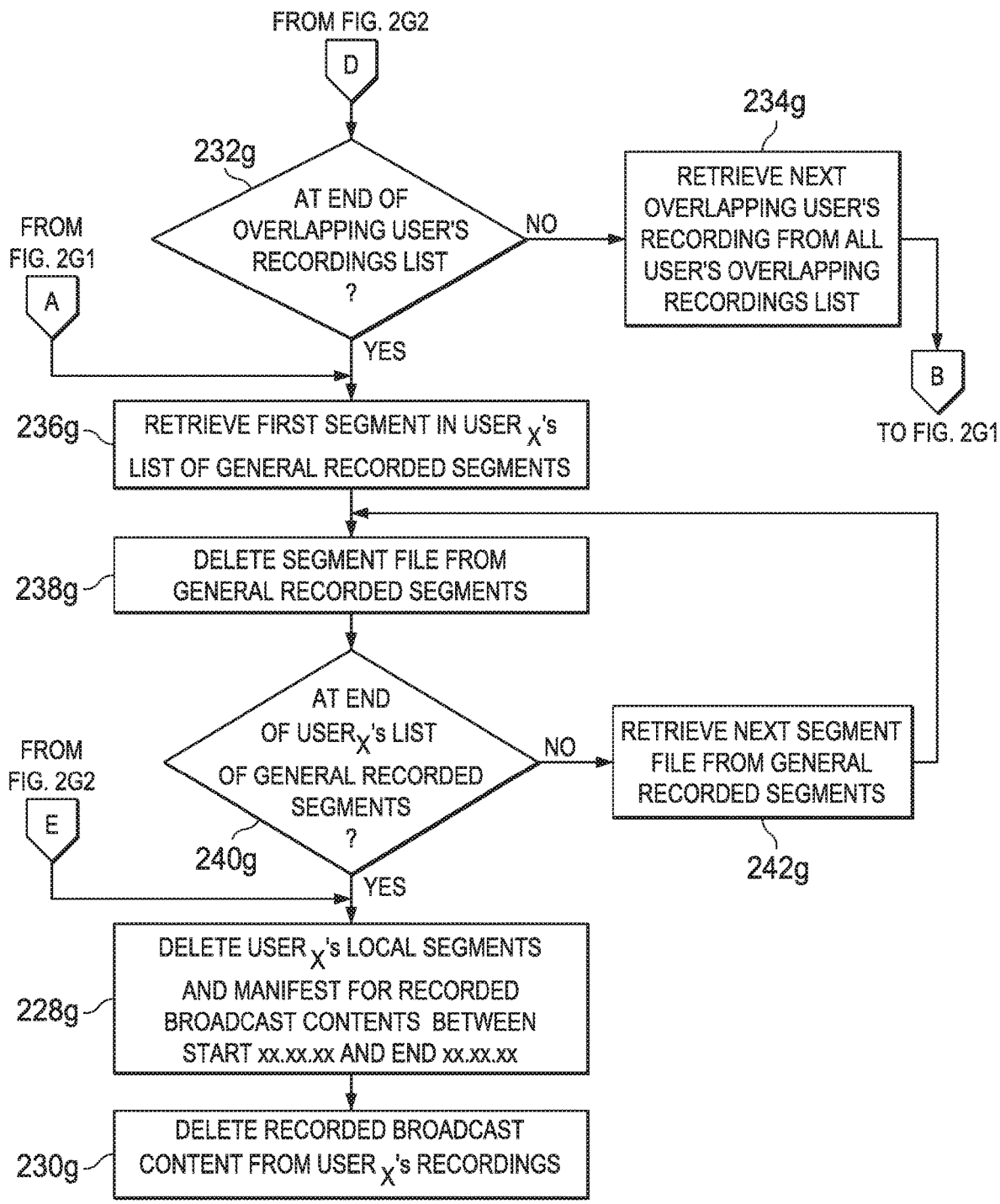
FIG. 2G3

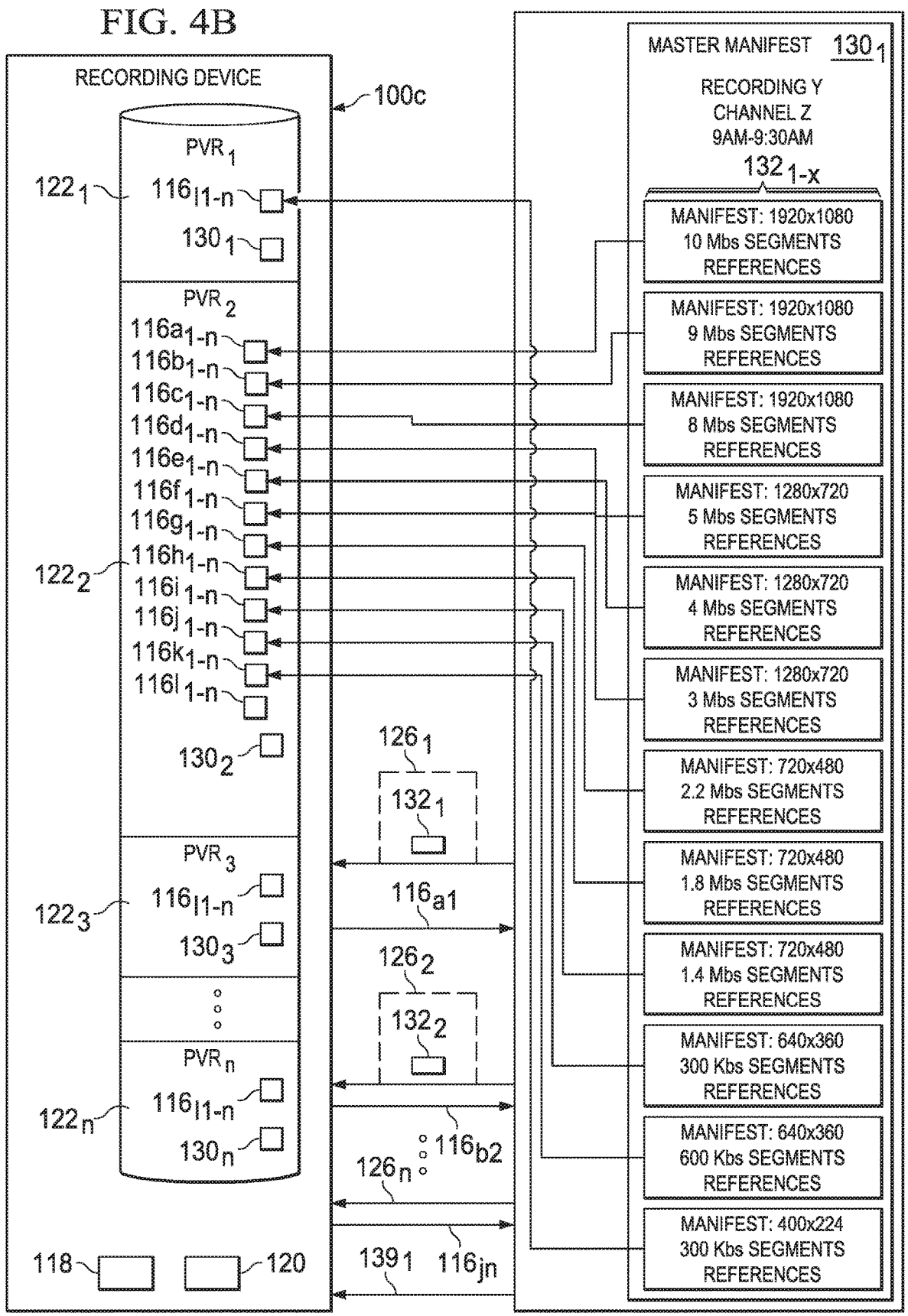

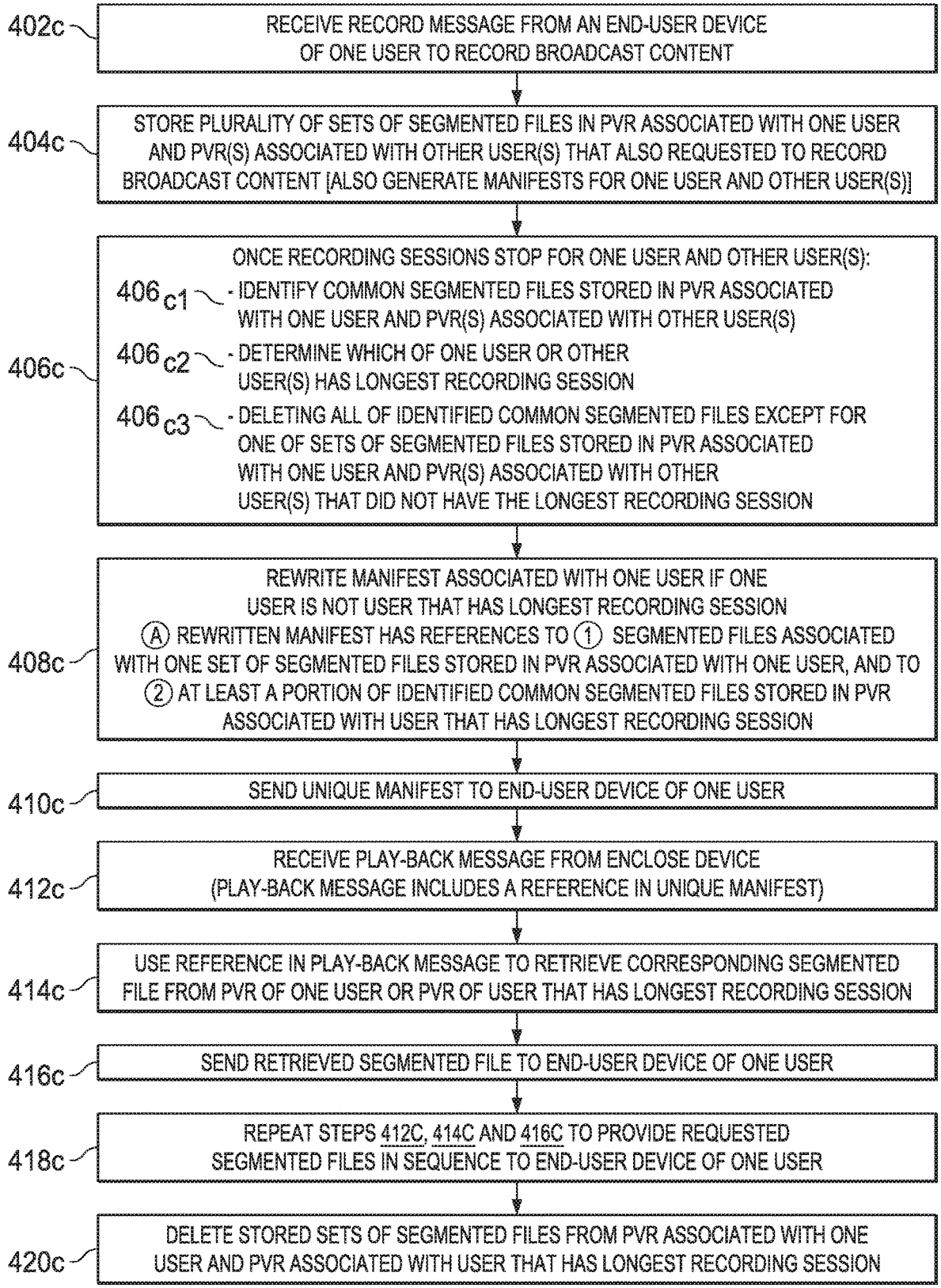

RECORDING DEVICE AND METHOD FOR EFFICIENT NETWORK PERSONAL VIDEO RECORDER MANIPULATION THROUGH ADAPTIVE BIT RATE STREAMING

CLAIM OF PRIORITY

This application is a continuation application of U.S. patent application Ser. No. 15/917,580, filed Mar. 10, 2018, which is a continuation of U.S. patent application Ser. No. 14/035,665, filed Sep. 24, 2013, now U.S. Pat. No. 9,955,203, the contents of which are hereby incorporated by reference herein.

TECHNICAL FIELD

The present invention relates in general to a network-based personal video recording service and, in particular, to a recording device and a method for providing a network-based personal video recording service utilizing adaptive bit rate technology for a plurality of users.

BACKGROUND

The following abbreviations and terms are herewith defined, at least some of which are referred to within the following description of the state of the art and the present invention.

| | |
|---|---|
| DVR | Digital Video Recorder |
| Kbs | Kilobytes per second |
| Mbs | Megabytes per second |
| PVR | Personal Video Recorder |
| VCR | Video Cassette Recorder |

Operators today provide a network-based PVR service which allows their customers to record broadcast content in network-based PVRs at will in a similar way that they can record broadcast content by using their non-network-based equivalents such as VCRs, DVRs and regular PVRs. In performing this network-based PVR service, the operators need to follow legal mandates (in the United States and elsewhere) which require that their network-based PVRs store one copy of the recorded content for each user. Such legal mandates can result in inefficiencies especially if the operators happened to utilize adaptive bit rate streaming technology to stream the recorded broadcast content to their users. In this case, the operators would likely keep multiple copies of the same recorded broadcast content each with a different bit rate in everyone of the network-based PVRs associated with each of the users that recorded the broadcast content. This would not be an efficient use of the storage capacity of the network-based PVRs. Hence, there is a need to address this problem and other problems associated with a network-based PVR service which utilizes adaptive bit rate technology to record and stream the recorded broadcast content to customers.

SUMMARY

A recording device and a method for providing a network-based personal video recording service which addresses the aforementioned problem and other problems are described in the independent claims of the present application. Advantageous embodiments of the recording device and method have been described in the dependent claims of the present application.

In one aspect, the present invention includes a recording device for providing a network-based personal video recording service for a plurality of users. The recording device comprises a plurality of PVR storage units, a processor, and a memory, wherein the processor interfaces with the memory and executes the processor-executable instructions stored therein to enable a receiving operation, a storing operation, a generating operation, and a sending operation. In the receiving operation, the recording device receives a record message from an end-user device associated with one user of the plurality of users, wherein the record message contains a request to record a broadcast content. In the storing operation, the recording device stores a plurality of sets of segmented files associated with the broadcast content, wherein each one of the sets of segmented files has a bitrate that is different than bitrates of the remaining sets of the segmented files. In the generating operation, the recording device generates a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user. In the sending operation, the recording device sends the unique manifest to the end-user device associated with the one user. The recording device is a marked-improvement over the prior art since the recording device stores one set of the segmented files (single bit rate) of the broadcast content within the PVR storage unit associated with the one user rather than having to store all the sets of the segmented files (multiple bit rates) within the PVR storage unit associated with the one user.

In another aspect, the present invention includes a method implemented by a recording device for providing a network-based personal video recording service for a plurality of users. The method comprises a receiving operation, a storing operation, a generating operation, and a sending operation. In the receiving operation, the recording device receives a record message from an end-user device associated with one user of the plurality of users, wherein the record message contains a request to record a broadcast content. In the storing operation, the recording device stores a plurality of sets of segmented files associated with the broadcast content, wherein each one of the sets of segmented files has a bitrate that is different than bitrates of the remaining sets of the segmented files. In the generating operation, the recording device generates a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user. In the sending operation, the recording device sends the unique manifest to the end-user device associated with the one user. The method is a marked-improvement over the prior art since the recording device stores one set of the segmented files (single bit rate) of the broadcast content within the PVR storage unit associated with the one user rather than having to store all the sets of the segmented files (multiple bit rates) within the PVR storage unit associated with the one user.

Additional aspects of the invention will be set forth, in part, in the detailed description, figures and any claims which follow, and in part will be derived from the detailed description, or can be learned by practice of the invention.

It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 2A-2B are basic diagrams of a recording device configured to provide a network-based personal video recording service for one or more users in accordance with a first embodiment of the present invention;

FIG. 2G1-2G3 is a flowchart illustrating an exemplary method that can be performed by the recording device shown in FIGS. 2A-2B to delete a recorded broadcast content per the method shown in FIG. 2C in accordance with the first embodiment of the present invention;

FIGS. 4A-4B are basic diagrams of a recording device configured to provide a network-based personal video recording service for multiple users in accordance with a third embodiment of the present invention; and FIG. 4C is a flowchart of a method implemented by the recording device shown in FIGS. 4A-4B to provide a network-based personal video recording service for multiple users in accordance with the third embodiment of the present invention.

DETAILED DESCRIPTION

Figure 1A:
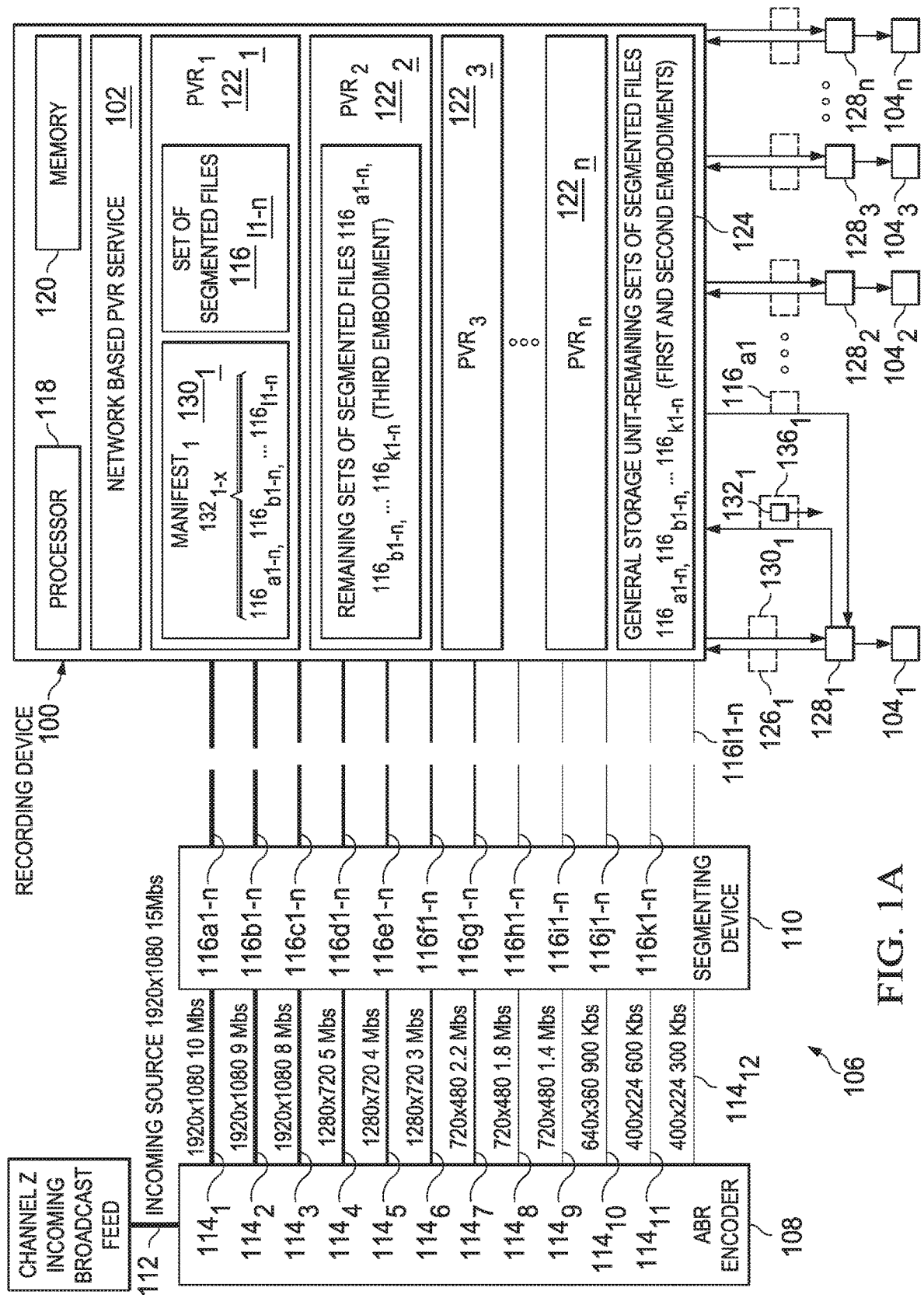
FIG. 1A is a basic diagram of a recording device configured to provide a network-based personal video recording service for one or more users in accordance with an embodiment of the present invention.
Figure 1B:
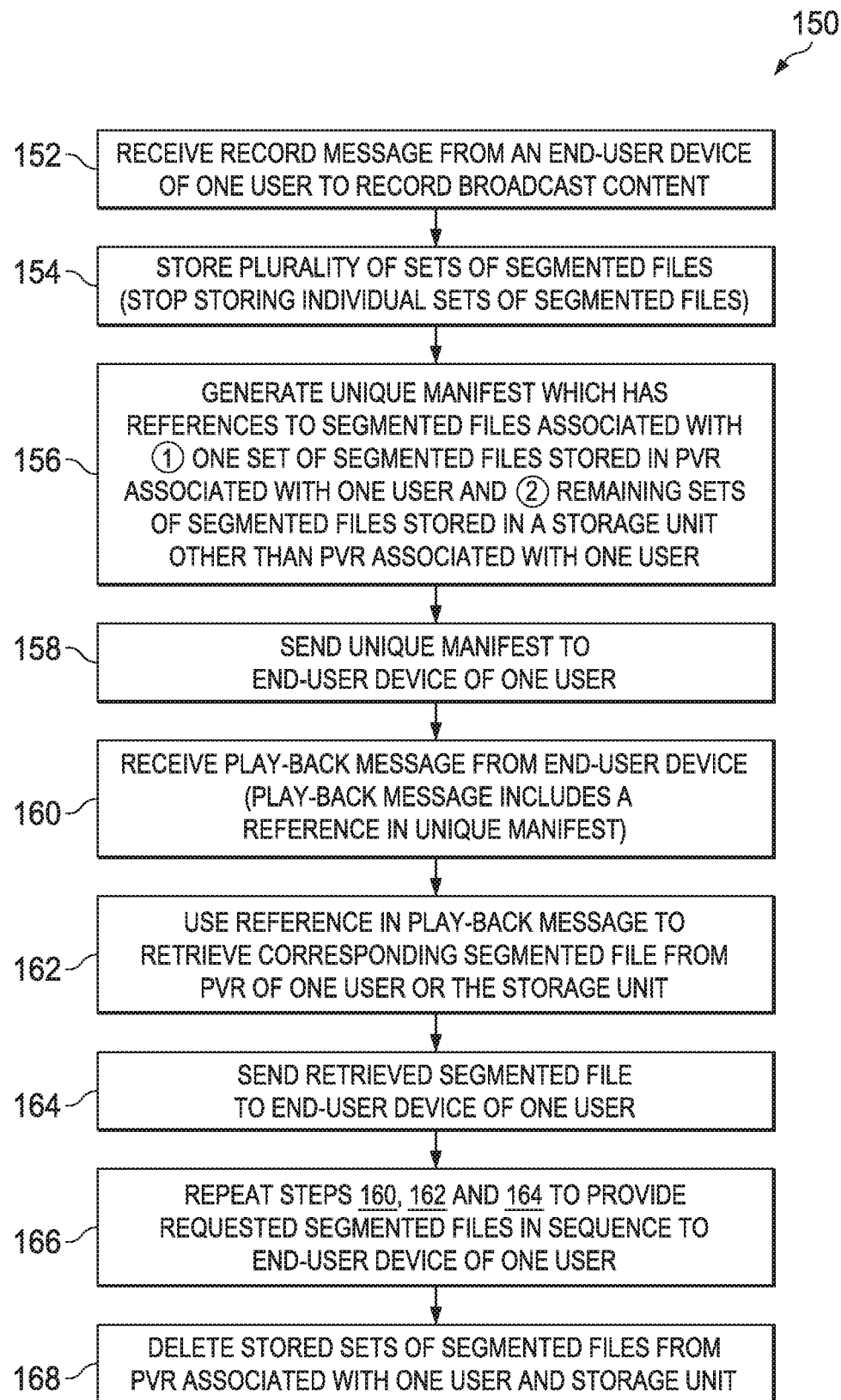
FIG. 1B is a flowchart of a method implemented by the recording device shown in FIG. 1A to provide a network-based personal video recording service for one or more users in accordance with an embodiment of the present invention.

Referring to FIGS. 1A-1B, there are respectively illustrated a basic diagram of a recording device 100 and a flowchart of a method 150 implemented by the recording device 100 to provide a network-based personal video recording service 102 for one or more users $104_1$, $104_2$, $104_3$ . . . $104_n$ in accordance with an embodiment of the present invention. In FIG. 1A, the recording device 100 is shown as being part of a broadcast network 106 (e.g., cable-based content delivery network 106, internet-based content delivery network 106, satellite-based content delivery network 106) that utilizes adaptive bit rate technology to deliver broadcast content to the users $104_1$, $104_2$, $104_3$ . . . $104_n$. The content delivery network 106 includes many well-known components which are used to deliver (stream) different broadcast content (multiple channels) to the users $104_1$, $104_2$, $104_3$ . . . $104_n$ but only two of these known components namely an adaptive bit rate encoder 108 and a segmenting device 110 which are useful in helping to describe the network-based personal video recording service 102 of the present invention are discussed and shown herein.

The adaptive bit rate encoder 108 is configured to receive a broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 108 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$. For clarity, only one broadcast content 112 (e.g., channel Z) is shown and described herein.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$. Each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device 100 receives the multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ from the segmenting device 110. A detailed description is provided next on how the recording device 100 is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ in order provide the network-based personal video recording service 102 for the users $104_1$, $104_2$, $104_3$ . . . $104_n$ in accordance with an embodiment of the present invention.

The recording device 100 is shown as having a processor 118, a memory 120, multiple PVR storage units $122_1$, $122_2$, $122_3$ . . . $122_n$ and an optional general storage unit 124. The recording device 100 can have additional well-known components but for clarity only the components needed to explain the present invention are described herein. The recording device 100 is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 1B's receiving step 152). The record message $126_1$ contains a request to record the broadcast content 112.

2. Storing multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ associated with the broadcast content 112 (see FIG. 1B's storing step 154). The various storage locations in which the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ can be stored are discussed in step 3. In addition, FIGS. 2-4's descriptions explain three exemplary ways and various locations where the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ can be stored to provide the network-based personal video recording service 102 for the users $104_1$, $104_2$, $104_3$ ... $104_n$.

3. Generating a unique manifest $130_1$ (or similar document) for the user $104_1$ (see FIG. 1B's generating step 156). The unique manifest $130_1$ has an individual reference $132_{1-x}$ to each of the segmented files associated with (1) one of the sets of segmented files $116_{l1-n}$ (for example) which are stored in the PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in a storage unit $122_2$, $122_3$ ... $122_n$ or 124 other than the PVR storage unit $122_1$ associated user $104_1$. As discussed in FIGS. 2-3 (first and second embodiments of present invention), the recording device 100 would store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ in the general storage unit 124. And, as discussed in FIG. 4 (third embodiment of present invention), the recording device 100 would store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ in one of the other PVR storage units $122_2$ (for example) associated with one of the other users $104_2$ (for example). In addition, FIGS. 2-4's descriptions explain some exemplary ways the manifest file $130_1$ and other manifest files $130_2$, $130_3$ ... $130_n$ can be generated in order to provide the network-based personal video recording service 102 for the users $104_1$, $104_2$, $104_3$ ... $104_n$.

4. Sending the unique manifest $130_1$ to the end-user device $128_1$ associated with user $104_1$ (see FIG. 1B's sending step 158).

5. Receiving a play-back message 136 from the end-user device $128_1$ associated with user $104_1$ (see FIG. 1B's receiving step 160). The play-back message 136 includes one of the references $132_1$ (for example) in the unique manifest $130_1$.

6. Using the one reference $132_1$ in the play-back message 136 to retrieve a corresponding segmented file $116_{a1}$ (for example) from the PVR storage unit $122_1$ associated with user $104_1$ or from the storage unit $122_2$, $122_3$ ... $122_n$ and 124 depending on which storage unit $122_1$, $122_2$, $122_3$ ... $122_n$ and 124 is actually storing the requested segmented file $116_{a1}$ (see FIG. 1B's using step 162). In this example, the segmented file $116_{a1}$ would be retrieved from the general storage unit 124 (for example) rather than from the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

7. Sending the retrieved segmented file $116_{a1}$ to the end-user device $128_1$ associated with user $104_1$ (see FIG. 1B's sending step 164).

8. Repeating the second receiving operation (step 5), the using operation (step 6), and the second sending operation (7) to provide in a sequential manner the requested segmented files $116_{b2}$, $116_{b3}$, $116_{c4}$, $116_{k5}$ ... $116_{jn}$ (for example) of the recorded broadcast content 112 to the end-user device $128_1$ associated with user $104_1$ (see FIG. 1B's repeating step 166).

9. Deleting the (1) one set of segmented files $116_{l1-n}$ (for example) stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in a storage unit $122_2$, $122_3$ ... $122_n$ or 124 other than the PVR storage unit $122_1$ associated with user $104_1$ after receiving a delete request $139_1$ from user $104_1$ (see FIG. 1B's deleting step 168). Exemplary ways that this deleting step could be performed are discussed below in the descriptions associated with FIGS. 2-4.

Note: The description above relates to providing the network-based personal video recording service 102 for one user $104_1$ but it should be appreciated that the same steps can be performed by the recording device 100 to provide the network-based personal video recording service 102 for any number of users $104_1$, $104_2$, $104_3$ ... $104_n$ each of which have their own end-user device $128_1$, $128_2$, $128_3$ ... $128_n$ and each of which can record the same broadcast content 112 (e.g., channel Z) or different broadcast content (e.g., channels A-Y) at the same or different times.

It should be appreciated that there a many ways one could configure the recording device 100 so as to provide the network-based personal video recording service 102 for the users $104_1$, $104_2$, $104_3$ ... $104_n$ based on the teachings that have described in FIGS. 1A-1B. In this regard, FIGS. 2-4 provide three exemplary ways that the recording device 100 can be configured and operated so as to provide the network-based personal video recording service 102 for the users $104_1$, $104_2$, $104_3$ ... $104_n$ in accordance with different embodiments of the present invention.

First Embodiment (FIGS. 2A-2G): The recording device 100a operates to store a single bit rate (e.g., segmented files $116_{l1-n}$—most likely the ones which have the lowest bit rate) of the broadcast content 112 into each individual network PVR storage unit $122_1$, $122_2$, $122_3$ ... $122_n$ per the requests in the record messages $126_1$, $126_2$, $126_3$ ... $126_n$ of the users $104_1$, $104_2$, $104_3$ ... $104_n$. At the same time, the recording device 100a operates such that as long as one user $104_1$ (for example) has initiated a recording of the broadcast content 112 to record all other bitrates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$) of the broadcast content 112 within the general storage unit 124. The recording device 100a also generates and stores the individual user's unique manifests $130_1$, $130_2$, $130_3$ ... $130_n$ within the individual user's network PVR storage units $122_1$, $122_2$, $122_3$ ... $122_n$. For instance, the network PVR storage unit $122_1$ would store manifest $130_1$ for user $104_1$, while the network PVR storage unit $122_2$ would store manifest $130_2$ for user $104_2$ and so on. The manifests $130_1$, $130_2$, $130_3$ . . . $130_n$ are specific to the corresponding users $104_1$, $104_2$, $104_3$ . . . $104_n$, where each manifest $130_1$, $130_2$, $130_3$ . . . $130_n$ references the respective user's personal bit rate (segmented files $116_{j1-n}$), as well as the general bitrates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$) whose time codes are synchronized to the corresponding personal bit rate. This time code synchronization of the general bit rates is done so the users $104_1$, $104_2$, $104_3$ . . . $104_n$ cannot watch general broadcast content 112 which they do not also have a local copy recorded in their respective network PVR storage unit $122_1$, $122_2$, $122_3$ . . . $122_n$. Should no users $104_1$, $104_2$, $104_3$ . . . $104_n$ be currently recording the broadcast content 112, then the recording device 100a does not record anything in the general storage unit 124. Should a user $104_1$ (for example) delete their recording, then the recording device 100a would delete that user's personal manifest $130_1$ and their single bit rate (segmented files $116_{j1-n}$) stored in their network PVR storage unit $122_1$. Additionally, the recording device 100a checks to see if that user $104_1$ has permission for recorded segments in the general storage unit 124 that no other user $104_2$, $104_3$ . . . $104_n$ can access. If so, the recording device 100 deletes those segments as well (since no one will be able to view them anymore). An advantage of the first embodiment is that it allows both user initiated recording and prescheduled recording to be handled by the recording device 100a.

Second Embodiment (FIGS. 3A-3C): The second embodiment is the same as the first embodiment except that the recording device 100b is always capturing and storing general bitrates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$) of the broadcast content 112 in the general storage unit 124 regardless of whether or not any of the users $104_1$, $104_2$, $104_3$ . . . $104_n$ have requested to record the broadcast content 112. Basically, the recording device 100b is configured to record the broadcast content 112 at a single bit rate (most likely lowest bit rate available) for each user $104_1$, $104_2$, $104_3$ . . . $104_n$ who wishes to record it within their respective network PVR storage unit $122_1$, $122_2$, $122_3$ . . . 122a. And, prior to this time, the recording system 100b has been recording the remaining bitrates if not all of the bitrates of the broadcast content 112 in the general storage unit 124. Thus, when a user $104_1$ (for example) attempts to stream their recorded broadcast content 112, the recording device 100b sends the user $104_1$ their unique manifest $130_1$ (or similar document) which contains references $132_{1-x}$ to all of the segmented files (bit rates) of the recorded broadcast content 112. The user $104_1$ can then use their unique manifest $130_1$ to access either their personally stored single bit rate (segmented files $116_{j1-n}$) or the generally stored bit rates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$).

Third Embodiment (FIGS. 4A-4C): The recording device 100c can record all bitrates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, $116_{l1-n}$) for each user $104_1$, $104_2$, $104_3$ . . . $104_n$ in their respective network PVR storage unit $122_1$, $122_2$, $122_3$ . . . $122_n$. When a specific user $104_1$ (for example) indicates that they would like to stop recording, then the recording device 100 ends their personal recording. After all users $104_1$, $104_2$, $104_3$ . . . $104_n$ have finished recording, then the recording device 100c determines which user $104_2$ (for example) has the "most complete" recording, and deletes everyone else's "extra" bitrates (leaving at least a single bit rate) in their respective network PVR storage unit $122_1$, $122_3$, . . . $122_n$. Then, when a user $104_1$ (for example) wants to play the recorded broadcast content 112, that user $104_1$ is provided a manifest $130_1$ with references to the "most complete" recording of the broadcast content 112 within the network PVR storage unit $122_2$ of user $104_2$ (for example) and the one bit rate (e.g., segmented files $116_{j1-n}$) within the network PVR storage unit $122_1$ of user $104_1$. As can be appreciated, the user $104_2$ (for example) which has the "most" complete recording will be provided a "normal" manifest $130_2$ while the remaining users $104_1$, $104_3$ . . . $104_n$ will be respectively provided "unique" manifests $130_1$, $130_3$ . . . $130_n$ which reference a patchwork of network PVR storage units $122_1$, $122_2$, $122_3$ . . . $122_n$. Should that recording be deleted by user $104_2$, the recording device 100 nevertheless will save that recording so long as any other user $104_1$, $104_3$ . . . $104_n$ has a single bit rate recording left for it in their network PVR storage units $122_1$, $122_3$ . . . $122_n$.

Figure 2A:
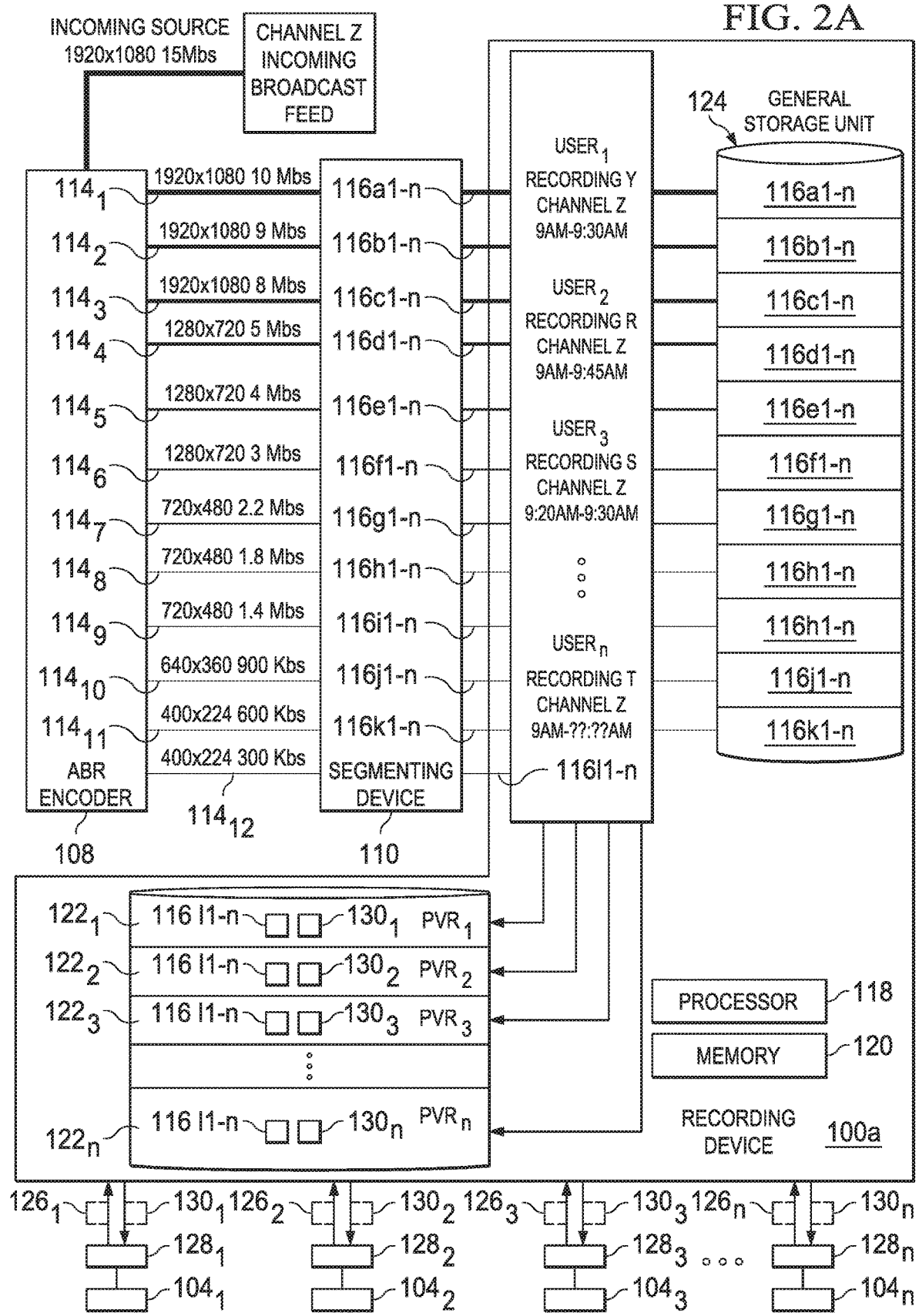

Referring to FIGS. 2A-2B, there are respectively illustrated a basic diagram of a recording device 100a and a flowchart of a method 200c implemented by the recording device 100a to provide the network-based personal video recording service 102 for one or more users $104_1$, $104_2$, $104_3$ . . . $104_n$ in accordance with the first embodiment of the present invention. In FIG. 2A, the recording device 100a is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1$, $104_2$, $104_3$ . . . $104_n$. The content delivery network 106 includes many well-known components which are used to deliver (stream) broadcast content (multiple channels) to the users $104_1$, $104_2$, $104_3$ . . . $104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$. Each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device 100a receives the multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ from the segmenting device 110. A detailed description is provided next on how the recording device 100a is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ to provide the network-based personal video recording service 102 for the users $104_1$, $104_2$, $104_3$ ... $104_n$ in accordance with the first embodiment of the present invention.

The recording device 100a is shown as having a processor 118, a memory 120, multiple PVR storage units $122_1$, $122_2$, $122_3$ ... $122_n$ and the general storage unit 124. The recording device 100a can have additional well-known components but for clarity only the components needed to explain the present invention are described herein. The recording device 100a is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 2C's receiving step 202c). In practice, the recording device 100a would receive record messages $126_1$, $126_2$, $126_3$ ... $126_n$ from the end-user devices $128_1$, $128_2$, $128_3$ ... $128_n$ (e.g., set-top-box computers, laptop computers, mobile phones (smart phones), tablets, internet capable televisions) respectively associated with users $104_1$, $104_2$, $104_3$ ... $104_n$. In this example, the record message $126_1$ contains a request to record the broadcast content 112 from 9:00 AM-9:30 AM for user $104_1$. The record message $126_2$ contains a request to record the broadcast content 112 from 9:00 AM-9:45 AM. The record message $126_3$ contains a request to record the broadcast content 112 from 9:20 AM-9:30 AM. And, the record message $126_n$ contains a request to record the broadcast content 112 from 9:08 AM-??.??, where the user $104_n$ selected the record button on channel Z (broadcast content 112) at 9:08 AM and ??.?? is when the user $104_n$ selects the stop button. In one embodiment, the recording device 100a can receive a "prescheduled" record message $126_1$ from user $104_1$ (or any other user $104_2$, $104_3$ ... $104_n$) where the "prescheduled" record message $126_1$ contains a request to record the broadcast content 112 in the future by indicating a particular start time and a particular end time.

2. Storing one of the sets of segmented files $116_{l1-n}$ (e.g., the lowest bit rate) in the network PVR storage unit $122_1$ associated with user $104_1$ (see FIG. 2C's receiving step 204c1). In this example, the segmented files $116_{l1-n}$ are stored in the network PVR storage unit $122_1$ associated with user $104_1$ from 9:00 AM-9:30 AM. In addition, the recording device 100a would store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124 if they are not already being stored therein (see FIG. 2Cs storing step 204c2). In this example, the recording device 100a begins to store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124 at 9:00 AM. Plus, the recording device 100a stores the segmented files $116_{l1-n}$ in the network PVR storage unit $122_2$ associated with user $104_2$ from 9:00 AM-9:45 AM. In addition, the recording device 100a stores the segmented files $116_{l1-n}$ in the network PVR storage unit $122_3$ associated with user $104_3$ from 9:20 AM-9:30 AM. The recording device 100a also stores the segmented files $116_{l1-n}$ in the network PVR storage unit $122_n$ associated with user $104_n$ from 9:08 AM-??.??. Once, user $104_n$ stops the recording of the broadcast content 112 assuming it is after 9:45 AM then the recording device 100a stops storing the segmented files $116_{l1-n}$ in the network PVR storage unit $122_n$ associated with user $104_n$ and stops storing the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{j1-n}$, $116_{k1-n}$ in the general storage unit 124.

3. Generating a unique manifest $130_1$ for the user $104_1$ (see FIG. 2C's generating step 206c). The unique manifest $130_1$ has individual references $132_{1-x}$ to each of the segmented files associated with (1) one of the sets of segmented files $116_{l1-n}$ (for example) which are stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In this example, the recording device 100a also generates a unique manifest $130_2$ for user $104_2$, where the unique manifest $130_2$ has individual references $132_{1-x}$ to each of the segmented files associated with (1) one of the sets of segmented files $116_{l1-n}$ (for example) which are stored in the network PVR storage unit $122_2$ associated with user $104_2$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In addition, the recording device 100a generates a unique manifest $130_3$ for user $104_3$, where the unique manifest $130_3$ has individual references $132_{1-x}$ to each of the segmented files associated with (1) one of the sets of segmented files $116_{l1-n}$ (for example) which are stored in the network PVR storage unit $122_3$ associated with user $104_3$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The recording device 100a also generates a unique manifest $130_n$ for user $104_n$, where the unique manifest $130_n$ has individual references $132_{1-x}$ to each of the segmented files associated with (1) one of the sets of segmented files $116_{l1-n}$ (for example) which are stored in the network PVR storage unit $122_n$ associated with user $104_n$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The unique manifests $130_1$, $130_2$, $130_3$ ... $130_n$ each have individual references $132_{1-x}$ to each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ associated with the broadcast content 112 for time periods of 9:00 AM-9:30 AM for user $104_1$, 9:00 AM-9:45 AM for user $104_2$, 9:20 AM-9:30 AM for user $104_3$, and 9:08 AM-??.?? for user $104_n$, respectively.

4. Sending the unique manifest $130_1$ to the end-user device $128_1$ associated with user $104_1$ (see FIG. 2C's sending step 208c). In this example, the recording device 100a also sends unique manifests $130_2$, $130_3$ ... $130_n$ to the end-user devices $128_2$, $128_3$ ... $128_n$ associated with users $104_2$, $104_3$ ... $104_n$ (note: the unique manifest $130_n$ would be sent to user $104_n$ upon the completion of the recording process which is when user $104_n$ stops the recording). FIG. 2A graphically illustrates steps 1-4 while FIG. 2B graphically illustrates the following steps 5-8.

5. Receiving a play-back message $136_1$ from the end-user device $128_1$ associated with user $104_1$ (see FIG. 2C's receiving step 210c). The play-back message $136_1$ includes one of the references $132_1$ (for example) in the unique manifest $130_1$. FIG. 2B illustrates the recording device $100a$ receiving the play-back message $136_1$ from the end-user device $128_1$ associated with user $104_1$. For clarity, the recording device $100a$ shown in FIG. 2B does not illustrate the recording device $100a$ receiving play-back messages $136_2$, $136_3 \ldots 136_n$ from end-user devices $128_2, 128_3 \ldots 128_n$ associated with users $104_2, 104_3 \ldots 104_n$. In addition, FIG. 2B does not illustrate the recording device $100a$ interacting with and streaming the requested segmented files of the recorded broadcast content 112 to the end-user devices $128_2$, $128_3 \ldots 128_n$ associated with users $104_2, 104_3 \ldots 104_n$. However, it should be appreciated that the recording device $100a$ interacts with and streams the requested segmented files of the recorded broadcast content 112 to the end-user devices $128_2, 128_3 \ldots 128_n$ associated with users $104_2$, $104_3 \ldots 104_n$ in the same manner as it does with user $104_1$.

6. Using the one reference $132_1$ in the play-back message $136_1$ to retrieve a corresponding segmented file $116_{a1}$ (for example) from either the PVR storage unit $122_1$ associated with user $104_1$ or from the general storage unit 124 depending on which storage unit $122_1$ or 124 is actually storing the requested segmented file $116_{a1}$ (see FIG. 2C's using step $212c$). In this example, the recording device $100a$ would retrieve the segmented file $116_{a1}$ from the general storage unit 124 since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

7. Sending the retrieved segmented file $116_{a1}$ to the end-user device $128_1$ associated with user $104_1$ (see FIG. 2C's sending step $214c$).

8. Repeating the second receiving operation (step 5) by receiving play-back messages $136_2, 136_3, 136_4 \ldots 136_n$ with references $132_2, 132_3, 132_4 \ldots 132_n$, the using operation (step 6) to retrieve segmented files $116_{b2}, 116_{b3}, 116_{c4} \ldots 116_{jn}$ (for example), and the second sending operation (step 7) by sending the retrieved segmented files $116_{b2}, 116_{b3}, 116_{c4} \ldots 116_{jn}$ of the broadcast content 112 in a sequential manner to the end-user device $128_1$ associated with user $104_1$ (see FIG. 2C's repeating step $216c$).

9. Deleting the (1) one set of segmented files $116_{l1-n}$ (for example) stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124 after receiving a delete request $139_1$ from user $104_1$ (see FIG. 2C's deleting step $218c$).

Note: The description above with respect to steps 5-9 relates to providing the network-based personal video recording service 102 for one user $104_1$ but it should be appreciated that the same steps can be performed by the recording device $100a$ to provide the network-based personal video recording service 102 for any number of users $104_1, 104_2, 104_3 \ldots 104_n$ each of which have their own end-user device $128_1$, $128_2, 128_3 \ldots 128_n$ and each of which can record the same broadcast content 112 (e.g., channel Z) or different broadcast content (e.g., channels A-Y) at the same time or different times.

Figure 2C:
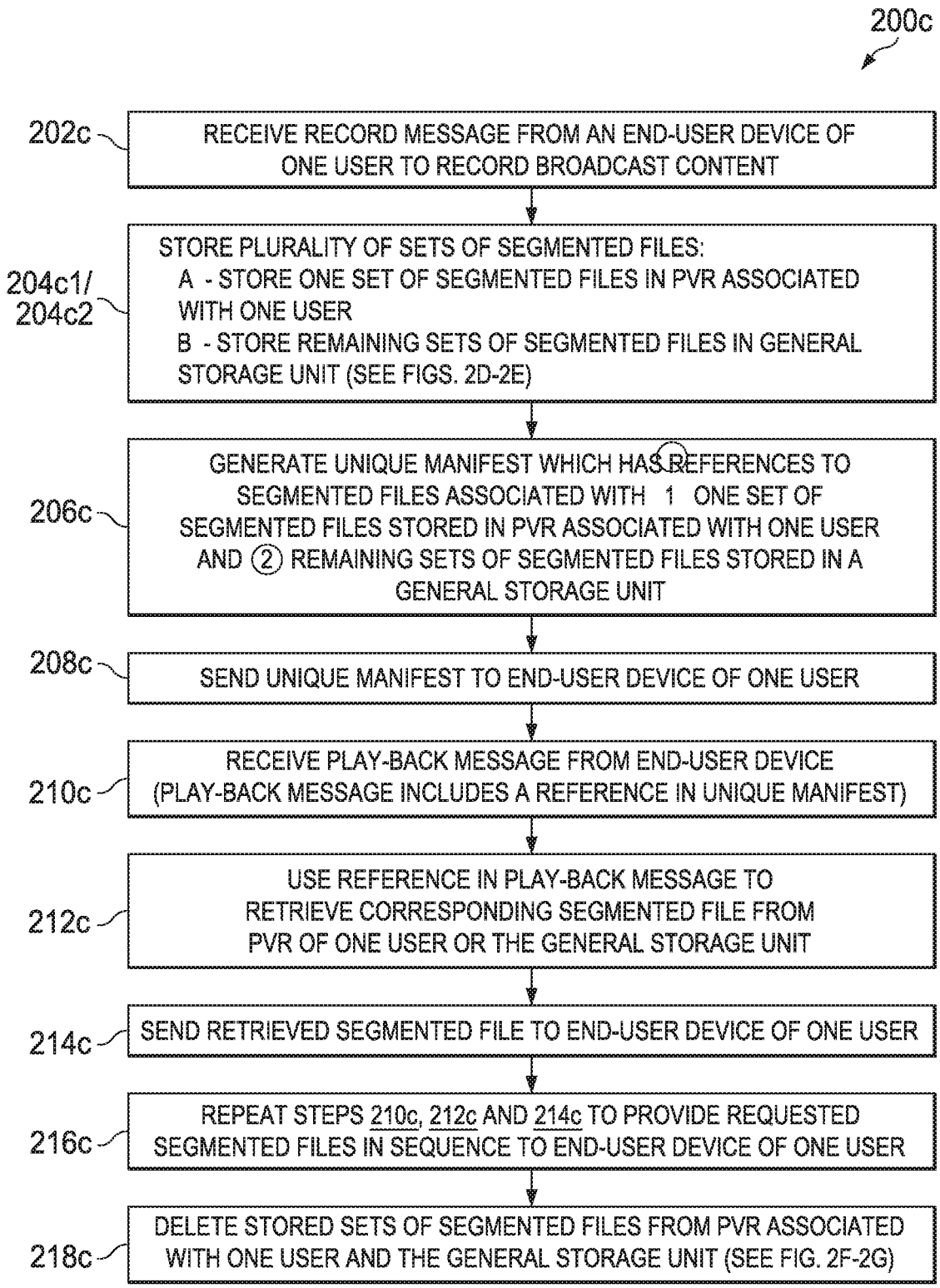
FIG. 2C is a flowchart of a method implemented by the recording device shown in FIGS. 2A-2B to provide a network-based personal video recording service for one or more users in accordance with the first embodiment of the present invention.
Figure 2D:
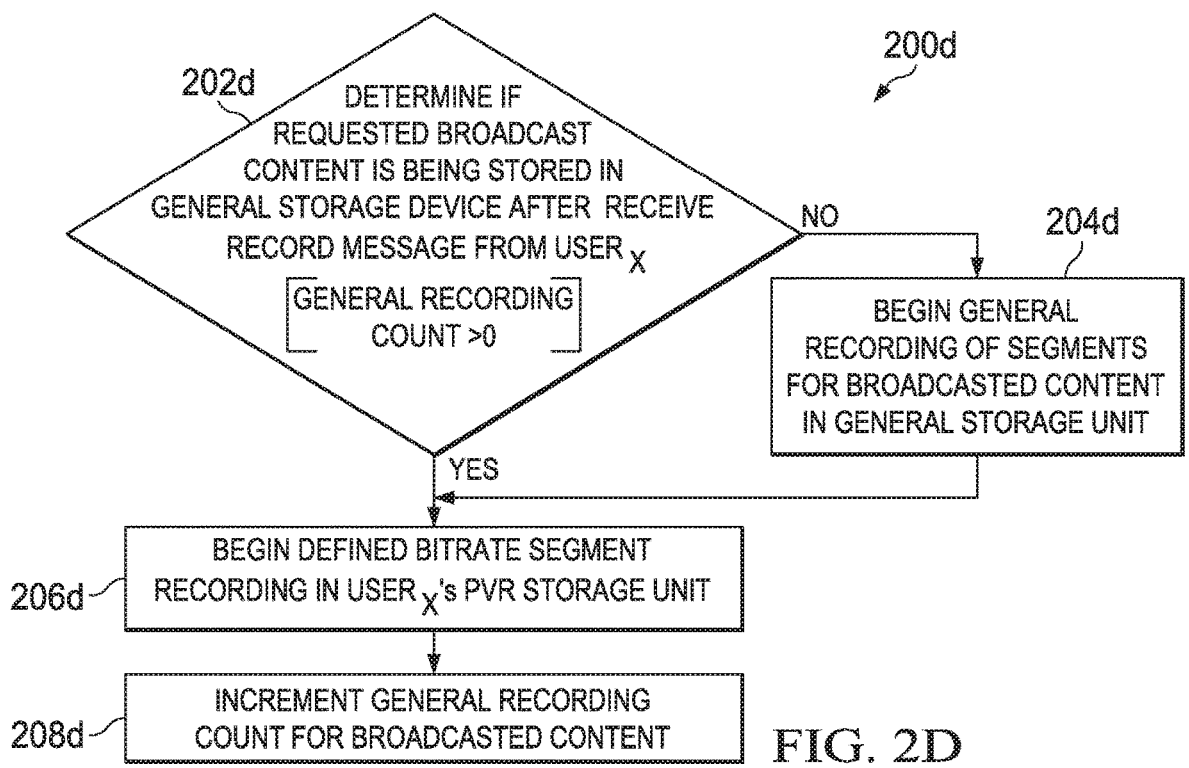
FIG. 2D is a flowchart illustrating an exemplary method that can be performed by the recording device shown in FIGS. 2A-2B to start a storing process of the method shown in FIG. 2C in accordance with the first embodiment of the present invention.

Referring to FIG. 2D, there is shown a basic flowchart illustrating an exemplary method $200d$ that can be performed by the recording device $100a$ to start the storing process in accordance with the first embodiment of the present invention (see the aforementioned step 3 and FIG. 2C's storing step $204c$). In the beginning step $202d$, the recording device $100a$ upon receiving a record message $126_x$ (which can be anyone of record messages $126_1, 126_2$, $126_3 \ldots 126_n$) from user $104_x$ (which can be anyone of users $104_1, 104_2, 104_3 \ldots 104_n$) determines if the broadcast content 112 is currently being stored in the general storage unit 124 (e.g., determine if general recording count >0 for broadcast content 112 which if yes means more than one other user $104_1, 104_2, 104_3 \ldots 104_n$ is already recording the broadcast content 112). If the result of the determining step $202d$ is no, beginning at step $204d$ to store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124. After step $204d$ or if a result of the determining step $202d$ is yes, beginning at step $206d$ to store the one set of segmented files $116_{l1-n}$ in the network PVR $122_x$ associated with user $104_x$. After the beginning step $206d$, incrementing at step $208d$ the general recording count for the broadcast content 112 to indicate the actual number of users $104_1, 104_2, 104_3 \ldots 104_n$ who are currently recording the broadcast content 112. At the end of step $208d$, the recording device $100a$ would begin generating the unique manifest $130_x$ for user $104_x$ as discussed about in step 4 and FIG. 2C's step $206c$.

Figure 2E:
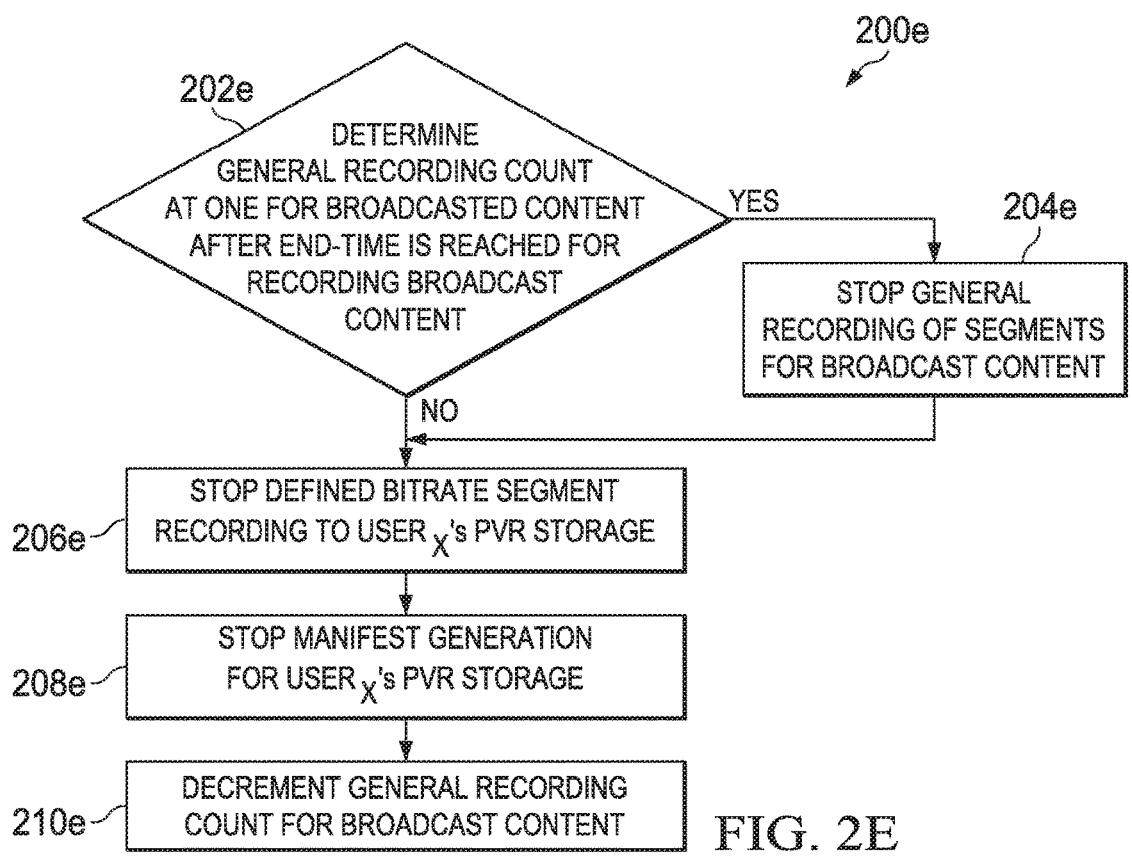
FIG. 2E is a flowchart illustrating an exemplary method that can be performed by the recording device shown in FIGS. 2A-2B to stop the storing process of the method shown in FIG. 2C in accordance with the first embodiment of the present invention.

Referring to FIG. 2E, there is shown a basic flowchart illustrating an exemplary method $200e$ that can be performed by the recording device $100a$ to stop the storing process in accordance with the first embodiment of the present invention (see the aforementioned step 3 and FIG. 2C's storing step $204c$). In the beginning step $202e$, the recording device $100a$ after an end time has been reached for recording the broadcast content 112 for a user $104_x$ (which can be anyone of users $104_1, 104_2, 104_3 \ldots 104_n$) determines if a general recording count is at one indicating that user $104_x$ is the only user that was recording the broadcast content 112. If the result of the determining step $202e$ is yes, the recording device $100a$ at step $204e$ stops the storing of the remaining sets of segmented files files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ in the general storage unit 124. After the stopping step $204e$ or if the result of the determining step $202e$ is no, the recording device $100a$ at step $206e$ stops the storing of the one set of segmented files $116_{l1-n}$ in the network PVR storage unit $122_x$ of user $104_x$. After the stopping step $206e$, the recording device $100a$ at step $208e$ stops the generation of the unique manifest $130_x$ for user $104_x$, and then the recording device $100a$ at step $210e$ decrements the general recording count by one for the broadcast content 112. If desired, the recording device $100a$ can perform step $210e$ before performing step $208e$.

Figure 2F:
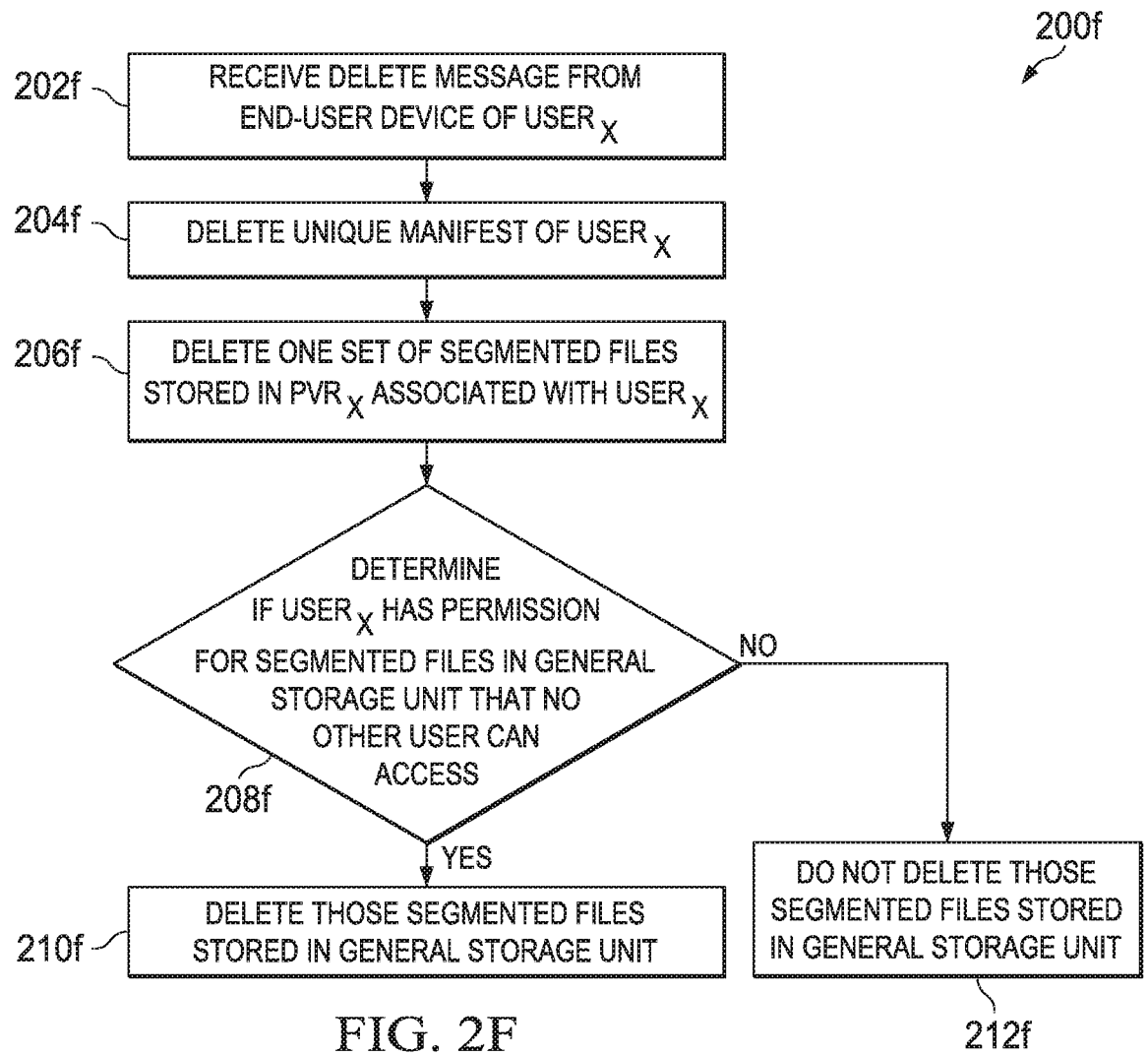
FIG. 2F is a flowchart illustrating an exemplary method that can be performed by the recording device shown in FIGS. 2A-2B to delete a recorded broadcast content per the method shown in FIG. 2C in accordance with the first embodiment of the present invention.

Referring to FIG. 2F, there is shown a basic flowchart illustrating an exemplary method $200f$ that can be performed by the recording device $100a$ to delete a recorded broadcast content 112 in accordance with the first embodiment of the present invention (see the aforementioned step 9 and FIG. 2C's deleting step $218c$). At step $202f$, the recording device $100a$ receives a delete request $139_x$ from user $104_x$ (which can be anyone of users $104_1, 104_2, 104_3 \ldots 104_n$). The delete message $139_x$ contains a request to delete the recorded broadcast content 112 associated with user $104_x$. At step $204f$, the recording device $100a$ deletes the unique manifest $130_x$ of user $104_x$. At step $206f$, the recording device $100a$ deletes the segmented files $116_{l1-n}$ associated with the recorded broadcast content 112 stored in the network PVR $122_x$ associated with user $104_x$. At step $208f$, the recording device $100a$ determines if user $104_x$ has permission for segmented files associated with the recorded broadcast content 122 stored in the general storage unit 124 that none of the remaining users can access. If the result of the determining step 208f is yes, then the recording device 100a at step 210f deletes those stored segmented files in the general storage unit 124 that none of the remaining users can access. If the result of the determining step 208f is no, then the recording device 100a at step 212f does not delete those stored segmented files in the general storage unit 124 that none of the remaining users can access.

Referring to FIG. 2G1-2G3, there is shown a basic flowchart illustrating an exemplary method 200g that can be performed by the recording device 100a to delete a recorded broadcast content 112 in accordance with the first embodiment of the present invention (see the aforementioned step 9 and FIG. 2C's deleting step 218c). In the beginning at step 202g, the recording device 100a receives a delete request $139_x$ from user user $104_x$ (which can be anyone of users $104_1, 104_2, 104_3 \ldots 104_n$). The delete message $139_x$ contains a request to delete the recorded broadcast content 112 associated with user $104_x$. At step 204g, the recording device 100a retrieves the recorded broadcast content 112's start and end times. At step 206g, the recording device 100a generates a list of all general recorded segmented files for user $104_x$'s recording start and end times in the general storage unit 124. At step 208g, the recording device 100a generates a list of a all recordings from all users $104_1, 104_2, 104_3 \ldots 104_n$ (not including user $104_x$) that include an overlap time between user $104_x$'s start and end times for the recorded broadcast content 112. At step 210g, the recording device 100a determines if the overlapping user's recordings list is empty. If the result of step 210g is no, then the recording device 100a at steps 212g, 214g and 216g respectively retrieves the first overlapping user's recording from all user's overlapping recording lists, retrieves the first segment in user $104x$'s list of general recorded segments, and retrieves the first segment from overlapping user's (not user $104_x$) general recorded segments. Then, the recording device 100a at step 218g determines if user $104_x$'s segment is same as overlapping user's segment. If the result of step 218g is yes, then the recording device 100a at step 220g removes the segment file from user $104_x$'s list of general recorded segments. After step 220g or if the result of step 218g is no, the recording device 100a at step 222g determines if at end of user's (non user $104_x$) overlapping segments. If the result of step 222g is no, then the recording device 100a at step 224g determines if list of general recorded segments for user $104_x$ is empty. If the result of step 224g is no, then the recording device 100a at step 226g retrieves the next segment from the general user's (non user $104_x$) recorded broadcast content 112 and then proceeds back to step 218g. If the result of step 224g is yes, then the recording device 100a at step 228g deletes user $104_x$'s local segments and manifest $130_x$ for the recorded broadcast content 112 between start and end. Then, the recording device 100a at step 230g deletes the recorded broadcast content 112 from the list of other recorded broadcast content. If the result of step 222g is yes, then the recording device 100a at step 232g determines if at end of overlapping user's recording list. If the result of step 232g is no, then the recording device 100a at step 234g gets next overlapping user's recording from all user's overlapping recording lists and then proceeds back to step 214g. If the result of step 232g is yes or the result of step 210g is yes, then the recording device 100a at step 236g retrieves the first segment in user $104_x$'s list of general recorded segments. Then, the recording device 100a at step 238g deletes the segment file from general recorded segments. Thereafter, the recording device 100a at step 240g determines if at end of user $104_x$'s list of general recorded segments. If the result of step 240g is no, the recording device 100a at step 242g retrieves the next segment file from general recorded segments and proceeds to step 238g. If the result of step 240g is yes, then the recording device 100a proceeds to step 228g.

Figure 3A:
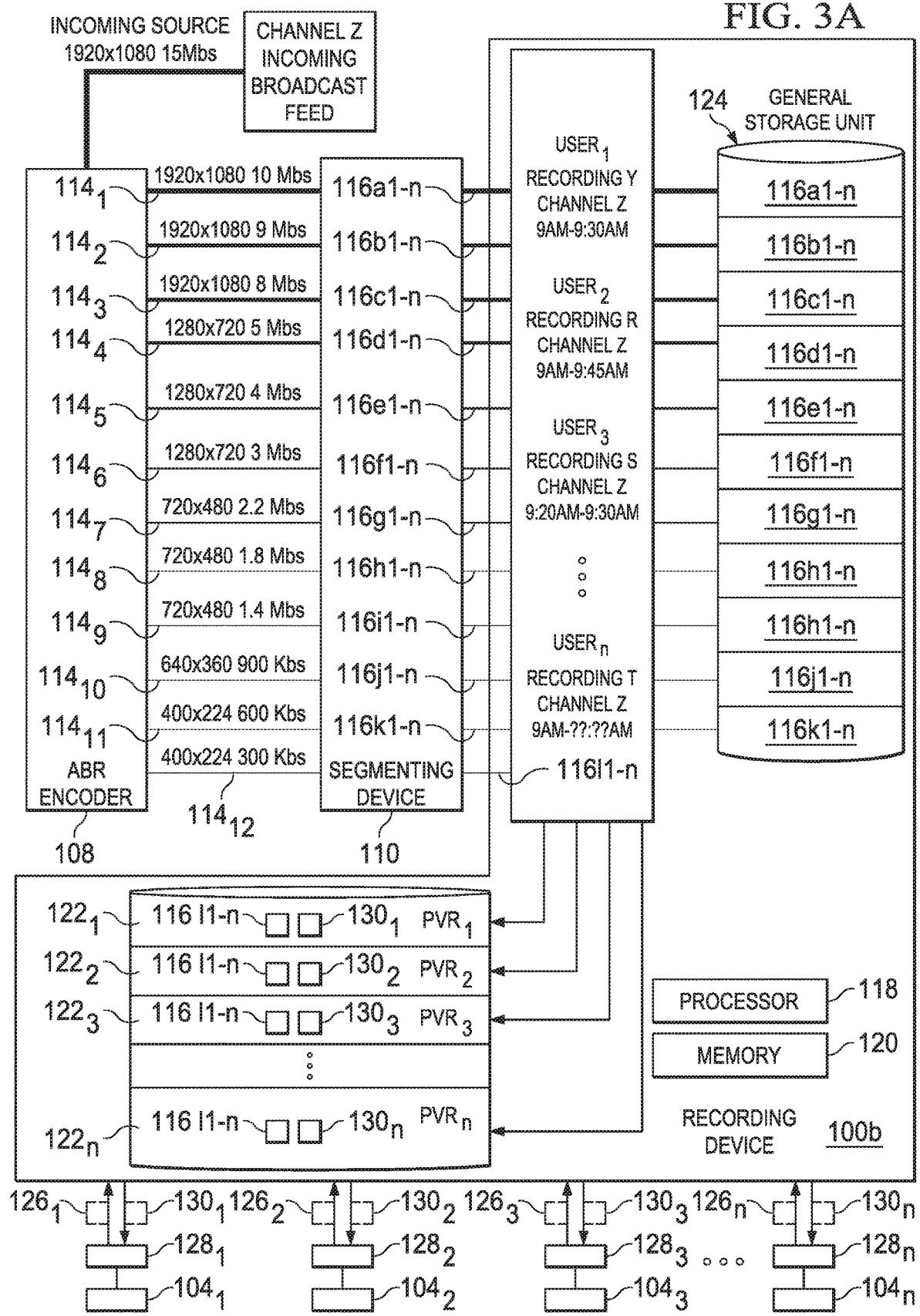
FIGS. 3A-3B are basic diagrams of a recording device configured to provide a network-based personal video recording service for one or more users in accordance with a second embodiment of the present invention.
Figure 3B:
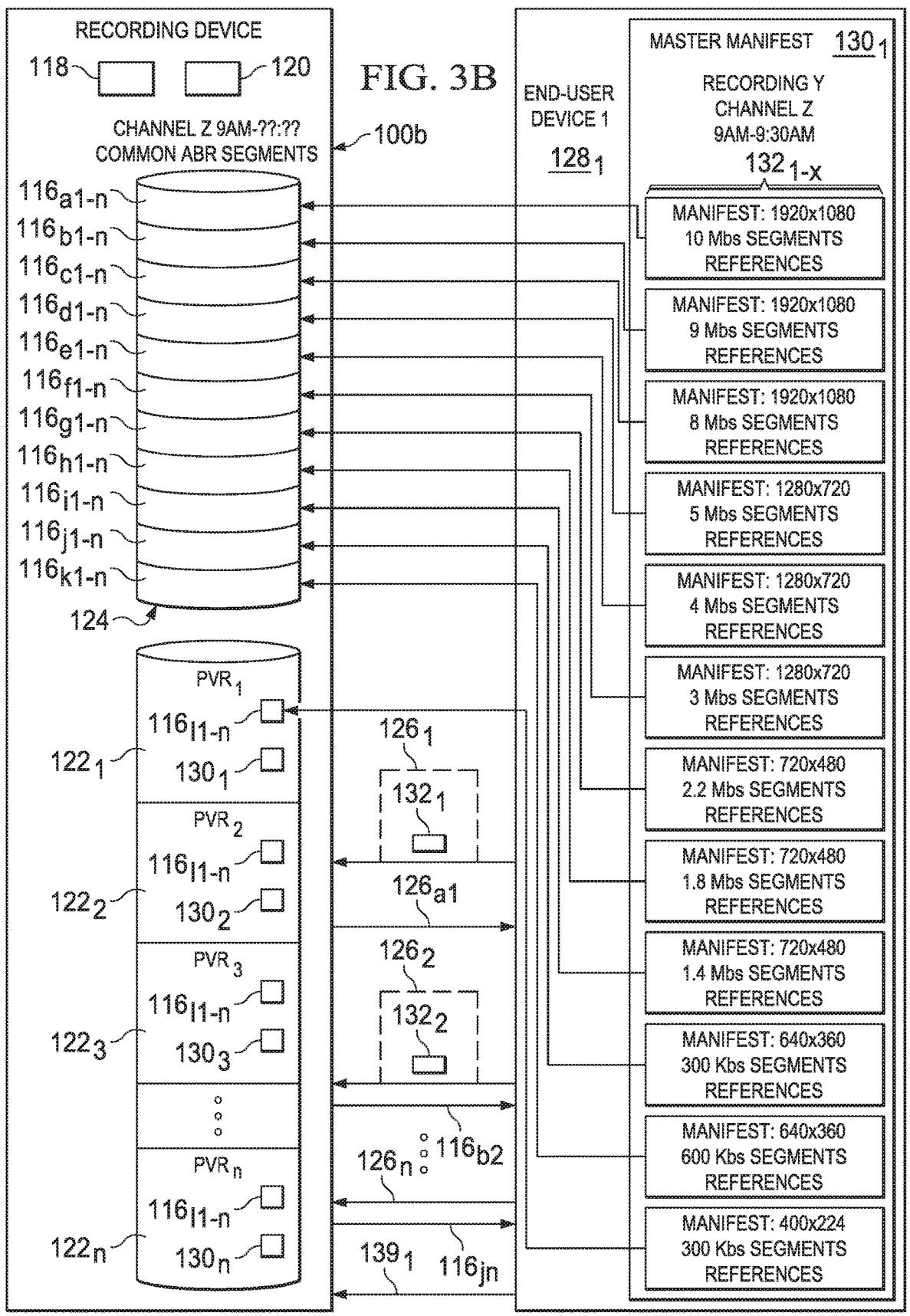
Figure 3C:
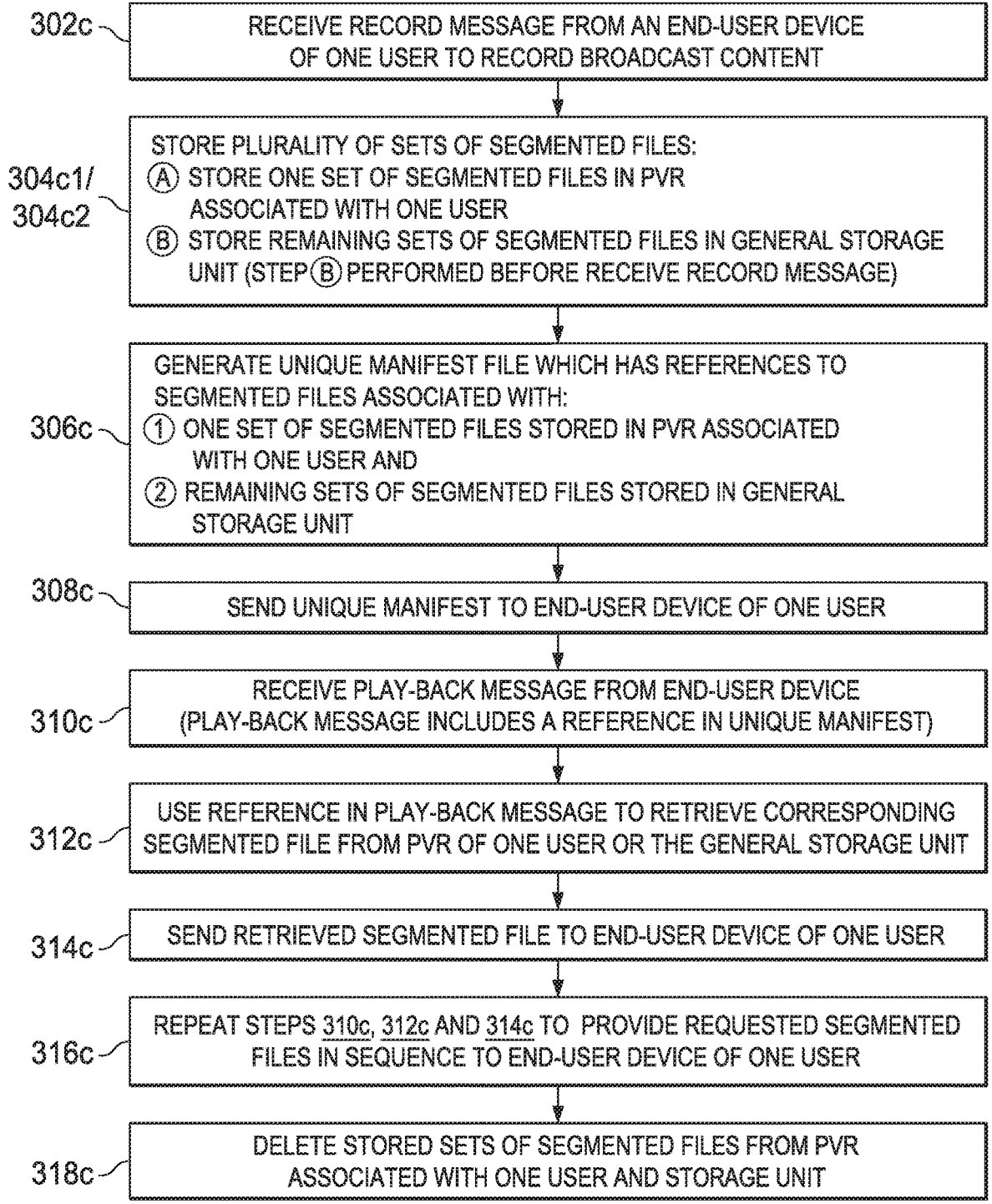
FIG. 3C is a flowchart of a method implemented by the recording device shown in FIGS. 3A-3B to provide a network-based personal video recording service for one or more users in accordance with the second embodiment of the present invention.

Referring to FIGS. 3A-3C, there are respectively illustrated a basic diagram of a recording device 100b and a flowchart of a method 300 implemented by the recording device 100b to provide the network-based personal video recording service 102 for one or more users $104_1, 104_2, 104_3 \ldots 104_n$ in accordance with the second embodiment of the present invention. In FIG. 3A, the recording device 100b is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1, 104_2, 104_3 \ldots 104_n$. The content delivery network 106 includes many well-known components which are used to deliver (stream) broadcast content (multiple channels) to the users $104_1, 104_2, 104_3 \ldots 104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1, 114_2, 114_3, 114_4, 114_5, 114_6, 114_7, 114_8, 114_9, 114_{10}, 114_{11},$ and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1, 114_2, 114_3, 114_4, 114_5, 114_6, 114_7, 114_8, 114_9, 114_{10}, 114_{11},$ and $114_{12}$ and then segment each of the files $114_1, 114_2, 114_3, 114_4, 114_5, 114_6, 114_7, 114_8, 114_9, 114_{10}, 114_{11},$ and $114_{12}$ into multiple segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n},$ and $116_{l1-n}$. Each of the segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n},$ and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device 100b receives the multiple sets of segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n},$ and $116_{l1-n}$ from the segmenting device 110. A detailed description is provided next on how the recording device 100b is configured to store these segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n},$ and $116_{l1-n}$ to provide the network-based personal video recording service 102 for the users $104_1, 104_2, 104_3 \ldots 104_n$ in accordance with the second embodiment of the present invention.

The recording device 100b is shown as having a processor 118, a memory 120, multiple PVR storage units $122_1, 122_2,$ $122_3 \ldots 122_n$ and the general storage unit 124. The recording device 100*b* can have additional well-known components but for clarity only the components needed to explain the present invention are described herein. The recording device 100*b* is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 3C's receiving step 302*c*). In practice, the recording device 100*b* would receive record messages $126_1$, $126_2$, $126_3 \ldots 126_n$ from the end-user devices $128_1$, $128_2$, $128_3 \ldots 128_n$ (e.g., set-top-box computers, laptop computers, mobile phones (smart phones), tablets, internet capable televisions) respectively associated with users $104_1$, $104_2$, $104_3 \ldots 104_n$. In this example, the record message $126_1$ contains a request to record the broadcast content 112 from 9:00 AM-9:30 AM for user $104_1$. The record message $126_2$ contains a request to record the broadcast content 112 from 9:00 AM-9:45 AM. The record message $126_3$ contains a request to record the broadcast content 112 from 9:20 AM-9:30 AM. And, the record message $126_n$ contains a request to record the broadcast content 112 from 9:08 AM-??.??, where the user $104_n$ selected the record button on channel Z (broadcast content 112) at 9:08 AM and ??.?? is when the user $104_n$ selects the stop button. In one embodiment, the recording device 100*b* can receive a "prescheduled" record message $126_1$ from user $104_1$ (or any other user $104_2$, $104_3 \ldots 104_n$) where the "prescheduled" record message $126_1$ contains a request to record the broadcast content 112 in the future by indicating a particular start time and a particular end time.

2. Storing one of the sets of segmented files $116_{j1-n}$ (e.g., the lowest bit rate) in the network PVR storage unit $122_1$ associated with user $104_1$ (see FIG. 3C's receiving step 304*c*1). In this example, the segmented files $116_{j1-n}$ are stored in the network PVR storage unit $122_1$ associated with user $104_1$ from 9:00 AM-9:30 AM. In addition, the recording device 100*b* would have already been storing the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ (or all of the sets of segmented files) of the broadcast content 112 in the general storage unit 124 (see FIG. 3Cs storing step 304*c*2). In particular, the recording device 100*b* always stores the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124 regardless of whether or not a record message $126_x$ (anyone of the record messages $126_1$, $126_2$, $126_3 \ldots 126_n$) is received from an end-user device $128_x$ (anyone of the end-user devices $128_1$, $128_2$, $128_3 \ldots 128_n$) of a user $104_x$ (anyone of the users $104_1$, $104_2$, $104_3 \ldots 104_n$). In this example, the recording device 100*b* would have been storing the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ (or all of the sets of segmented files) of the broadcast content 112 in the general storage unit 124 prior to 9:00 AM. Plus, the recording device 100*b* would store the segmented files $116_{j1-n}$ in the network PVR storage unit $122_2$ associated with user $104_2$ from 9:00 AM-9:45 AM. In addition, the recording device 100*b* stores the segmented files $116_{j1-n}$ in the network PVR storage unit $122_3$ associated with user $104_3$ from 9:20 AM-9:30 AM. The recording device 100*b* also stores the segmented files $116_{j1-n}$ in the network PVR storage unit $122_n$ associated with user $104_n$ from 9:08 AM-??.??. Once, user $104_n$ stops the recording of the broadcast content 112 assuming it is after 9:45 AM then the recording device 100*b* stops storing the segmented files $116_{j1-n}$ in the network PVR storage unit $122_n$ associated with user $104_n$ but would continue storing the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ (or all of the sets of segmented files) in the general storage unit 124.

3. Generating a unique manifest $130_1$ for the user $104_1$ (see FIG. 3C's generating step 306*c*). The unique manifest $130_1$ has individual references $132_{1-x}$ to each of the segmented files associated with (1) one of the sets of segmented files $116_{j1-n}$ (for example) which are stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In this example, the recording device 100*b* also generates a unique manifest $130_2$ for user $104_2$, where the unique manifest $130_2$ has individual references $132_{1-x}$ to each of the segmented files associated with (1) one of the sets of segmented files $116_{j1-n}$ (for example) which are stored in the network PVR storage unit $122_2$ associated with user $104_2$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In addition, the recording device 100*b* generates a unique manifest $130_3$ for user $104_3$, where the unique manifest $130_3$ has individual references $132_{1-x}$ to each of the segmented files associated with (1) one of the sets of segmented files $116_{j1-n}$ (for example) which are stored in the network PVR storage unit $122_3$ associated with user $104_3$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The recording device 100*b* also generates a unique manifest $130_n$ for user $104_n$, where the unique manifest $130_n$ has individual references $132_{1-x}$ to each of the segmented files associated with (1) one of the sets of segmented files $116_{j1-n}$ (for example) which are stored in the network PVR storage unit $122_n$ associated with user $104_n$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The unique manifests $130_1$, $130_2$, $130_3 \ldots 130_n$ each have individual references $132_{1-x}$ to each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{j1-n}$ associated with the broadcast content 112 for time periods of 9:00 AM-9:30 AM for user $104_1$, 9:00 AM-9:45 AM for user $104_2$, 9:20 AM-9:30 AM for user $104_3$, and 9:08 AM-??.?? for user $104_n$, respectively.

4. Sending the unique manifest $130_1$ to the end-user device $128_1$ associated with user $104_1$ (see FIG. 3C's sending step 308*c*). In this example, the recording device 100*b* also sends unique manifests $130_2$, $130_3 \ldots 130_n$ to the end-user devices $128_2$, $128_3 \ldots 128_n$ associated with users $104_2$, $104_3 \ldots 104_n$ (note: the unique manifest $130_n$ would be sent to user $104_n$ upon the completion of the recording process which is when user $104_n$ stops the recording). FIG. 3A graphically illustrates steps 1-4 while FIG. 3B graphically illustrates the following steps 5-8.

5. Receiving a play-back message $136_1$ from the end-user device $128_1$ associated with user $104_1$ (see FIG. 3C's receiving step 310*c*). The play-back message $136_1$ includes one of the references $132_1$ (for example) in the unique manifest $130_1$. FIG. 3B illustrates the recording device 100*b* receiving the play-back message $136_1$ from the end-user device $128_1$ associated with user $104_1$. For clarity, the recording device $100a$ shown in FIG. 3B does not illustrate the recording device $100a$ receiving play-back messages $136_2$, $136_3 \ldots 136_n$ from end-user devices $128_2$, $128_3 \ldots 128_n$ associated with users $104_2$, $104_3 \ldots 104_n$. In addition, FIG. 3B does not illustrate the recording device $100a$ interacting with and streaming the requested segmented files of the recorded broadcast content 112 to the end-user devices $128_2$, $128_3 \ldots 128_n$ associated with users $104_2$, $104_3 \ldots 104_n$. However, it should be appreciated that the recording device $100a$ interacts with and streams the requested segmented files of the recorded broadcast content 112 to the end-user devices $128_2$, $128_3 \ldots 128_n$ associated with users $104_2$, $104_3 \ldots 104_n$ in the same manner as it does with user $104_1$.

6. Using the one reference $132_1$ in the play-back message $136_1$ to retrieve a corresponding segmented file $116_{a1}$ (for example) from either the PVR storage unit $122_1$ associated with user $104_1$ or from the general storage unit 124 depending on which storage unit $122_1$ or 124 is actually storing the requested segmented file $116_{a1}$ (see FIG. 3C's using step $312c$). In this example, the recording device $100b$ would retrieve the segmented file $116_{a1}$ from the general storage unit 124 since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

7. Sending the retrieved segmented file $116_{a1}$ to the end-user device $128_1$ associated with user $104_1$ (see FIG. 3C's sending step $314c$).

8. Repeating the second receiving operation (step 5) by receiving play-back messages $136_2$, $136_3$, $136_4 \ldots 136_n$ with references $132_2$, $132_3$, $132_4 \ldots 132_n$, the using operation (step 6) to retrieve segmented files $116_{b2}$, $116_{b3}$, $116_{c4} \ldots 116_{jn}$ (for example), and the second sending operation (step 7) by sending the retrieved segmented files $116_{b2}$, $116_{b3}$, $116_{c4} \ldots 116_{jn}$ of the broadcast content 112 in a sequential manner to the end-user device $128_1$ associated with user $104_1$ (see FIG. 3C's repeating step $316c$).

9. Deleting the (1) one set of segmented files $116_{l1-n}$ (for example) stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124 after receiving a delete request $139_1$ from user $104_1$ (see FIG. 3C's deleting step $318c$).

Note: The description above relates to providing the network-based personal video recording service 102 for one user $104_1$ but it should be appreciated that the same steps can be performed by the recording device $100b$ to provide the network-based personal video recording service 102 for any number of users $104_1$, $104_2$, $104_3 \ldots 104_n$ each of which have their own end-user device $128_1$, $128_2$, $128_3 \ldots 128_n$ and each of which can record the same broadcast content 112 (e.g., channel Z) or different broadcast content (e.g., channels A-Y) at the same time or different times.

Figure 4A:
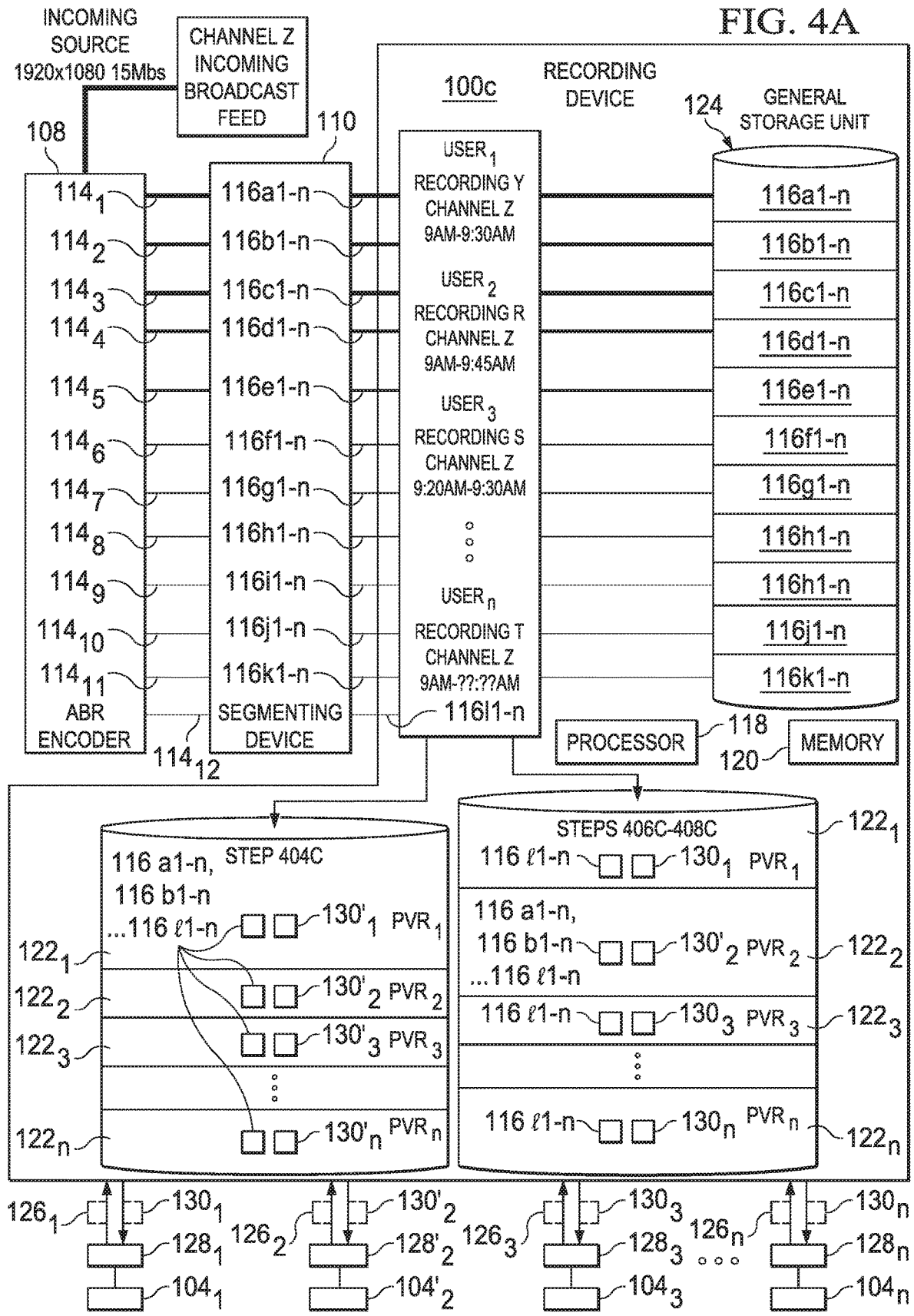

Referring to FIGS. 4A-4C, there are respectively illustrated a basic diagram of a recording device $100c$ and a flowchart of a method 400 implemented by the recording device $100c$ to provide the network-based personal video recording service 102 for one or more users $104_1$, $104_2$, $104_3 \ldots 104_n$ in accordance with the third embodiment of the present invention. In FIG. 4A, the recording device $100c$ is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1$, $104_2$, $104_3 \ldots 104_n$. The content delivery network 106 includes many well-known components which are used to deliver (stream) broadcast content (multiple channels) to the users $104_1$, $104_2$, $104_3 \ldots 104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$. Each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device $100c$ receives the multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ from the segmenting device 110. A detailed description is provided next on how the recording device $100c$ is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ to provide the network-based personal video recording service 102 for the users $104_1$, $104_2$, $104_3 \ldots 104_n$ in accordance with the second embodiment of the present invention.

The recording device $100c$ is shown as having a processor 118, a memory 120, multiple PVR storage units $122_1$, $122_2$, $122_3 \ldots 122_n$ and the general storage unit 124. The recording device $100c$ can have additional well-known components but for clarity only the components needed to explain the present invention are described herein. The recording device $100c$ is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 4C's receiving step $402c$). In practice, the recording device $100c$ would receive record messages $126_1$, $126_2$, $126_3$ ... $126_n$ from the end-user devices $128_1$, $128_2$, $128_3$ ... $128_n$ (e.g., set-top-box computers, laptop computers, mobile phones (smart phones), tablets, internet capable televisions) respectively associated with users $104_1$, $104_2$, $104_3$ ... $104_n$. In this example, the record message $126_1$ contains a request to record the broadcast content 112 from 9:00 AM-9:30 AM for user $104_1$. The record message $126_2$ contains a request to record the broadcast content 112 from 9:00 AM-9:45 AM. The record message $126_3$ contains a request to record the broadcast content 112 from 9:20 AM-9:30 AM. And, the record message $126_n$ contains a request to record the broadcast content 112 from 9:08 AM-??.??, where the user $104_n$ selected the record button on channel Z (broadcast content 112) at 9:08 AM and ??.?? is when the user $104_n$ selects the stop button. In one embodiment, the recording device 100c can receive a "prescheduled" record message $126_1$ from user $104_1$ (or any other user $104_2$, $104_3$ ... $104_n$) where the "prescheduled" record message $126_1$ contains a request to record the broadcast content 112 in the future by indicating a particular start time and a particular end time.

2. Storing all of the sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ corresponding to the requested broadcast content 112 within the network PVR $122_1$ associated with user $104_1$ and within the other network PVRs $122_2$, $122_3$ ... $122_n$ associated with users $104_2$, $104_3$ ... $104_n$ that also requested to record the broadcast content 112 (see FIG. 4C's storing step 404c). In this example, the recording device 100c would store the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_1$ associated with user $104_1$ from 9:00 AM-9:30 AM. Plus, the recording device 100c would store the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_2$ associated with user $104_2$ from 9:00 AM-9:45 AM. In addition, the recording device 100c stores the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_3$ associated with user $104_3$ from 9:20 AM-9:30 AM. The recording device 100c also stores the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_n$ associated with user $104_n$ from 9:08 AM-??.??. Once, user $104_n$ stops the recording of the broadcast content 112 then the recording device 100c stops storing the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_n$ associated with user $104_n$. At the same time the recording device 100c is performing storing step 404c it is also generating manifests $130_1{'}$, $130_2{'}$, $130_3{'}$ ... $130_n{'}$ respectively for users $104_1$, $104_2$, $104_3$ ... $104_n$. The manifests $130_1{'}$, $130_2{'}$, $130_3{'}$ ... $130_n{'}$ respectively have individual references $132_{1-x}$ to each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ associated with the broadcast content 112 in the corresponding network PVR storage units $122_1$, $122_2$, $122_3$ ... $122_n$ for time periods of 9:00 AM-9:30 AM for user $104_1$, 9:00 AM-9:45 AM for user $104_2$, 9:20 AM-9:30 AM for user $104_3$, and 9:08 AM-??.?? for user $104_n$.

3. Once the recording sessions stop for all of the users $104_1$, $104_2$, $104_3$ ... $104_n$ who had requested to record the broadcast content 112 then the recording device 100c performs following operations (see FIG. 4C's step 406c):

3a. Identifying common segmented files that have been stored in the network PVR $122_1$ associated with the user $104_1$ and in the other network PVRs $122_2$, $122_3$ ... $122_n$ associated with other users $104_2$, $104_3$ ... $104_n$ (see FIG. 4C's step 406c1).

3b. Determining which of the users $104_1$, $104_2$, $104_3$ ... $104_n$ that has longest recording session for the broadcast content 112 (see FIG. 4C's step 406c2). In this example, assume user $104_2$ has the longest recording session for the broadcast content 112.

3c. Deleting all of the identified common segmented files except for one set of segmented files $116_{l1-n}$ (for example) which are stored in the network PVRs $122_1$, $122_3$ ... $122_n$ (not PVR $122_2$) associated with the users $104_1$, $104_3$ ... $104_n$ that did not have the longest recording session for the broadcast content 112 (see FIG. 4C's step 406c3).

4. Re-writing the unique manifests $130_1{'}$, $130_3{'}$ ... $132_n{'}$ associated with users $104_1$, $104_3$ ... $104_n$ that did not have the longest recording session for the broadcast content 112 (see FIG. 4C's step 408c). In this example, the re-written unique manifest $130_1$ has references $132_{1-x}$ to (1) segmented files associated with the one set of segmented files $116_{l1-n}$ which are stored in the network PVR storage unit $122_1$ associated with user $104_1$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_1$ associated with user $104_1$). Further, the re-written unique manifest $130_3$ has references $132_{1-x}$ to (1) segmented files associated with the one set of segmented files $116_{l1-n}$ which are stored in the network PVR storage unit $122_3$ associated with user $104_3$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_3$ associated with user $104_3$). Plus, the re-written unique manifest $130_n$ has references $132_{1-x}$ to (1) segmented files associated with the one set of segmented files $116_{l1-n}$ which are stored in the network PVR storage unit $122_n$ associated with user $104_n$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_n$ associated with user $104_n$). The manifest $130_2{'}$ for user $104_2$ would not be re-written.

5. Sending the unique manifest $130_1$ to the end-user device $128_1$ associated with user $104_1$ (see FIG. 4C's step 410c). In this example, the recording device 100c also sends unique manifests $130_2{'}$, $130_3$ ... $130_n$ to the end-user devices $128_2$, $128_3$ ... $128_n$ associated with users $104_2$, $104_3$ ... $104_n$ (note: the unique manifest $130_n$ would be sent to user $104_n$ upon the completion of the recording process which is when user $104_n$ stops the recording). FIG. 4A graphically illustrates steps 1-5 while FIG. 4B graphically illustrates the following steps 6-9.

6. Receiving a play-back message $136_1$ from the end-user device $128_1$ associated with user $104_1$ (see FIG. 4C's receiving step $412c$). The play-back message $136_1$ includes one of the references $132_1$ (for example) in the unique manifest $130_1$. FIG. 4B illustrates the recording device $100c$ receiving the play-back message $136_1$ from the end-user device $128_1$ associated with user $104_1$. For clarity, the recording device $100a$ shown in FIG. 4B does not illustrate the recording device $100a$ receiving play-back messages $136_2$, $136_3$ ... $136_n$ from end-user devices $128_2$, $128_3$ ... $128_n$ associated with users $104_2$, $104_3$ ... $104_n$. In addition, FIG. 4B does not illustrate the recording device $100a$ interacting with and streaming the requested segmented files of the recorded broadcast content $112$ to the end-user devices $128_2$, $128_3$ ... $128_n$ associated with users $104_2$, $104_3$ ... $104_n$. However, it should be appreciated that the recording device $100a$ interacts with and streams the requested segmented files of the recorded broadcast content $112$ to the end-user devices $128_2$, $128_3$ ... $128_n$ associated with users $104_2$, $104_3$ ... $104_n$ in the same manner as it does with user $104_1$.

7. Using the one reference $132_1$ in the play-back message $136_1$ to retrieve a corresponding segmented file $116_{a1}$ (for example) from either the PVR storage unit $122_1$ associated with user $104_1$ or from PVR storage unit $122_3$ depending on which storage unit $122_1$ or $122_3$ is actually storing the requested segmented file $116_{a1}$ (see FIG. 4C's step $414c$). In this example, the recording device $100c$ would retrieve the segmented file $116_{a1}$ from PVR storage unit $122_2$ since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

8. Sending the retrieved segmented file $116_{a1}$ to the end-user device $128_1$ associated with user $104_1$ (see FIG. 4C's sending step $416c$).

9. Repeating the second receiving operation (step 6) by receiving play-back messages $136_2$, $136_3$, $136_4$ ... $136_n$ with references $132_2$, $132_3$, $132_4$ ... $132_n$, the using operation (step 7) to retrieve segmented files $116_{b2}$, $116_{b3}$, $116_{c4}$ ... $116_{jn}$ (for example), and the second sending operation (step 8) by sending the retrieved segmented files $116_{b2}$, $116_{b3}$, $116_{c4}$ ... $116j_n$ of the broadcast content $112$ in a sequential manner to the end-user device $128_1$ associated with user $104_1$ (see FIG. 4C's repeating step $418c$).

9. Deleting the (1) one set of segmented files $116_{f1-n}$ (for example) which are stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the PVR storage unit $122_2$ (assuming all other users $104_2$, $104_3$ ... $104_n$ have deleted the recorded broadcast content $112$) after receiving a delete request $139_1$ from user $104_1$ (see FIG. 4C's deleting step $420c$).

Note: The description above relates to providing the network-based personal video recording service $102$ for one user $104_1$ but it should be appreciated that the same steps can be performed by the recording device $100c$ to provide the network-based personal video recording service $102$ for any number of users $104_1$, $104_2$, $104_3$ ... $104_n$ each of which have their own end-user device $128_1$, $128_2$, $128_3$ ... $128_n$ and each of which can record the same broadcast content $112$ (e.g., channel Z) or different broadcast content (e.g., channels A-Y) at the same time or different times.

In view of the foregoing description, one skilled in the art will readily appreciate that the present invention is a marked improvement over the state-of-the-art since for each user $104_1$, $104_2$, $104_3$ ... $104_n$ who wishes to record broadcast content $112$ the recording device $110$ records at a minimum a single bit rate (segmented files $116_{k1-n}$) of the broadcast content $112$ within each user's network PVR storage unit $122_1$, $122_2$, $122_3$ ... $122_n$. The recording device $100$ also stores the other bit rates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$) in a central storage location $124$ (first and second embodiments) or some other storage location (third embodiment). In any embodiment, the users $104_1$, $104_2$, $104_3$ ... $104_n$ are confined to only viewing broadcast content $112$ that they have individually recorded (should they only record ten minutes of a program then that is all they can see). The recording device $100$ has many advantages some of which are as follows (for example):

The recording device $100$ eliminates certain inefficiencies by keeping one network copy (single bit rate) for each user $104_1$, $104_2$, $104_3$ ... $104_n$ in their respective network PVR storage unit $122_1$, $122_2$, $122_3$ ... $122_n$ while still keeping to existing laws.

The recording devices $100a$ and $100b$ also keeps the "user initiated" clause of existing laws.

The recording device $100a$ has the advantage of allowing complex and robust behavior in a single system with the least amount of waste by storing only manifest data and a single bitrate (one set of segmented files) in each network PVR storage unit $122_1$, $122_2$, $122_3$ ... $122_n$.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A system, in a content delivery network, for providing a network-based personal video recording service for a plurality of users, the system comprising:

a plurality of video recorder storage units in the content delivery network;

wherein the system is configured to:

receive a record message from an end-user device associated with one user of the plurality of users, wherein the record message contains a request to record a broadcast content;

store a plurality of sets of segmented files associated with the broadcast content, wherein each one of the sets of segmented files has a bitrate that is different than bitrates of the remaining sets of the segmented files;

generate a unique manifest for the one user, wherein the unique manifest has references to segmented files associated with (1) one of the sets of segmented files stored in one of the video recorder storage units associated with the one user, and (2) the remaining sets of segmented files stored in a storage unit other than the one of the video recorder storage units associated with the one user; and send the unique manifest to the end-user device associated with the one user.

2. The system of claim 1, wherein the system is further configured to:

receive a play-back message from the end-user device of the one user, wherein the play-back message includes one of the references in the unique manifest;

use the one reference in the play-back message to retrieve a corresponding segmented file from either the one of the video recorder storage units associated with the one user or from the storage unit;

send the retrieved segmented file to the end-user device; and repeat the second receive operation, the use operation, and the second send operation to provide requested segmented files of the recorded broadcast content in a sequential manner to the end-user device.

3. The system of claim 1, wherein the system is further configured to:

delete the one set of segmented files stored in the one of the video recorder storage units associated with the one user, and the remaining sets of segmented files which are stored in the storage unit.

4. The system of claim 1, wherein:

the storage unit is a general storage unit; and the system is further configured such that after receipt of the record message the store operation is started where the one of the sets of segmented files are stored in the one of the video recorder storage units associated with the one user, and when not already being stored begin to store the remaining sets of segmented files in the general storage unit.

5. The system of claim 4, wherein the record message contains a prescheduled record request to record the broadcast content during a particular start time and end time.

6. The system of claim 4, wherein the system is further configured to perform the store operation as follows:

determine, upon receiving the record message from the end-user device of the one user, whether the broadcast content is currently being stored in the general storage unit;

based on a result of the determining operation being no, begin to store the remaining sets of segmented files of the broadcast content in the general storage unit;

after beginning to store the remaining sets of segmented files of the broadcast content in the general storage unit or based on a result of the determine operation being yes, begin to store the one of the sets of segmented files of the broadcast content in the one of the video recorder storage units associated with the one user; and after beginning to store the one of the sets of segmented files of the broadcast content in the one of the video recorder storage units associated with the one user, increment a general recording count for the broadcast content to indicate number of users recording the broadcast content.

7. The system of claim 4, wherein the system is further configured to stop the store operation as follows:

determine, after an end time has been reached for recording the broadcast content for the one user, whether a general recording count is at one indicating that the one user is the only user that was recording the broadcast content;

based on a result of the determine operation being yes, stop the storing of the remaining sets of segmented files in the general storage unit;

after the stopping of the storing of the remaining sets of segmented files in the general storage unit or based on a result of the determine operation being no, stop the storing of the one of the sets of segmented files in the one of the video recorder storage units associated with the one user; and after the stopping of the storing of the one of the sets of segmented files in the one of the video recorder storage units associated with the one user, stop the generation of the unique manifest for the one user, and decrement the general recording count by one for the broadcast content.

8. The system of claim 4, wherein the system is further configured to:

receive a delete message from the end-user device associated with the one user, wherein the delete message contains a request to delete the recorded broadcast content associated with the one user;

delete the unique manifest of the one user;

delete the one set of segmented files stored in the one of the video recorder storage units associated with the one user;

determine whether the one user has permission for stored segmented files in the general storage unit that none of the remaining users can access;

based on a result of the determine operating being yes, delete the stored segmented files in the general storage unit that none of the remaining users can access; and based on a result of the determine operating being no, do not delete the stored segmented files in the general storage unit that none of the remaining users can access.

9. The system of claim 1, wherein:

the storage unit is a general storage unit; and the system is further configured such that before receiving the record message at least the remaining sets of segmented files are already being stored in the general storage unit, and after receiving the record message the one of the sets of segmented files are started to be stored in the one of the video recorder storage units associated with the one user.

10. The system of claim 1, wherein:

the storage unit is one of the video recorder storage units which is not associated with the one user;

the system is further configured to:

wherein the store operation includes storing the plurality of sets of segmented files in the one of the video recorder storage units associated with the one user and in one or more of the video recorder storage units associated with one or more other users that also requested to record the broadcast content;

after recording sessions stop for the one user and the one or more other users that requested to record the broadcast content then:

identify common segmented files that have been stored in the one of the video recorder storage units associated with the one user and in the one or more of the video recorder storage units associated with one or more other users;

determine which of the one user or the one or more other users that has longest recording session for the broadcast content;

delete all of the identified common segmented files except for the one of the sets of segmented files which are stored in the video recorder storage units associated with the one user or the one or more other users that did not have the longest recording session for the broadcast content; and the generate operation includes re-writing the unique manifest associated with the one user when the one user is not the user that has the longest recording session for the broadcast content such that the re-written unique manifest has references to segmented files associated with the one set of segmented files which are stored in the one of the video recorder storage units associated with the one user, and such that the re-written unique manifest has references to at least a portion of the identified common segmented files which are stored in the video recorder storage unit associated with the user that has the longest recording session, wherein the at least a portion of the identified common segmented files do not include the one set of segmented files which are stored in the one of the video recorder storage units associated with the one user.

11. A method implemented in a system, in a content delivery network, for providing a network-based personal video recording service for a plurality of users, wherein the system comprises a plurality of video recorder storage units in the content delivery network, the method comprising:
receiving a record message from an end-user device associated with one user of the plurality of users, wherein the record message contains a request to record a broadcast content;
storing a plurality of sets of segmented files associated with the broadcast content, wherein each one of the sets of segmented files has a bitrate that is different than bitrates of the remaining sets of the segmented files;
generating a unique manifest for the one user, wherein the unique manifest has references to segmented files associated with (1) one of the sets of segmented files stored in one of the video recorder storage units associated with the one user, and (2) the remaining sets of segmented files stored in a storage unit other than the one of the video recorder storage units associated with the one user; and
sending the unique manifest to the end-user device associated with the one user.

12. The method of claim 11, further comprising:
receiving a play-back message from the end-user device of the one user, wherein the play-back message includes one of the references in the unique manifest;
using the one reference in the play-back message to retrieve a corresponding segmented file from either the one of the video recorder storage units associated with the one user or from the storage unit;
sending the retrieved segmented file to the end-user device; and
repeating the second receiving step, the using step, and the second sending step to provide requested segmented files of the recorded broadcast content in a sequential manner to the end-user device.

13. The method of claim 11, further comprising:
deleting the one set of segmented files stored in the one of the video recorder storage units associated with the one user, and the remaining sets of segmented files which are stored in the storage unit.

14. The method of claim 11, wherein:
the storage unit is a general storage unit; and
after receiving the record message, the storing step is started such that the one of the sets of segmented files are stored in the one of the video recorder storage units associated with the one user, and beginning to store the remaining sets of segmented files in the general storage unit when the remaining sets of segmented files are not already being stored in the general storage unit.

15. The method of claim 14, wherein the storing step further comprises:
upon receiving the record message from the end-user device of the one user, determining whether the broadcast content is currently being stored in the general storage unit;
based on a result of the determining step being no, beginning to store the remaining sets of segmented files of the broadcast content in the general storage unit;
after beginning to store the remaining sets of segmented files of the broadcast content in the general storage unit or based on a result of the determining step being yes, beginning to store the one of the sets of segmented files of the broadcast content in the one of the video recorder storage units associated with the one user; and
after beginning to store the one of the sets of segmented files of the broadcast content in the one of the video recorder storage units associated with the one user, incrementing a general recording count for the broadcast content to indicate number of users recording the broadcast content.

16. The method of claim 14, wherein the storing step is stopped as follows:
determining, after an end time has been reached for recording the broadcast content for the one user, whether a general recording count is at one indicating that the one user is the only user that was recording the broadcast content;
based on a result of the determining step being yes, stopping the storing of the remaining sets of segmented files in the general storage unit;
after the stopping of the storing of the remaining sets of segmented files in the general storage unit or based on a result of the determining step being no, stopping the storing of the one of the sets of segmented files in the one of the video recorder storage units associated with the one user; and
after the stopping of the storing of the one of the sets of segmented files in the one of the video recorder storage units associated with the one user, stopping the generation of the unique manifest for the one user, and decrementing the general recording count by one for the broadcast content.

17. The method of claim 14, further comprising a step of deleting the stored broadcast content by:
receiving a delete message from the end-user device associated with the one user, wherein the delete message contains a request to delete the recorded broadcast content associated with the one user;
deleting the unique manifest of the one user;
deleting the one set of segmented files stored in the one of the video recorder storage units associated with the one user;
determining whether the one user has permission for stored segmented files in the general storage unit that none of the remaining users can access;
based on a result of the determining step being yes, deleting the stored segmented files in the general storage unit that none of the remaining users can access; and
based on a result of the determining step being no, do not delete the stored segmented files in the general storage unit that none of the remaining users can access.

18. The method of claim 11, wherein:
the storage unit is a general storage unit; and
before receiving the record message, storing at least the remaining sets of segmented files in the general storage unit and after receiving the record message starting to store the one of the sets of segmented files in the one of the video recorder storage units associated with the one user.

19. The method of claim 11, wherein:

the storage unit is one of the video recorder storage units which is not associated with the one user;

the storing operation includes storing the plurality of sets of segmented files in the one of the video recorder storage units associated with the one user and in one or more of the video recorder storage units associated with one or more other users that also requested to record the broadcast content;

after recording sessions stop for the one user and the one or more other users that requested to record the broadcast content then:

identifying common segmented files that have been stored in the one of the video recorder storage units associated with the one user and in the one or more of the video recorder storage units associated with one or more other users;

determining which of the one user or the one or more other users that has longest recording session for the broadcast content;

deleting all of the identified common segmented files except for the one of the sets of segmented files which are stored in the video recorder storage units associated with the one user or the one or more other users that did not have the longest recording session for the broadcast content; and the generating step includes re-writing the unique manifest associated with the one user if the one user is not the user that has the longest recording session for the broadcast content such that the re-written unique manifest has references to segmented files associated with the one set of segmented files which are stored in the one of the video recorder storage units associated with the one user, and such that the re-written unique manifest has references to at least a portion of the identified common segmented files which are stored in the video recorder storage unit associated with the user that has the longest recording session, wherein the at least a portion of the identified common segmented files do not include the one set of segmented files which are stored in the one of the video recorder storage units associated with the one user.

20. A non-transitory computer readable medium comprising computer readable code that, when executed by a system, in a content delivery network, having a plurality of video recorder storage units in the content delivery network, causes the system to:

receive a record message from an end-user device associated with one user of the plurality of users, wherein the record message contains a request to record a broadcast content;

store a plurality of sets of segmented files associated with the broadcast content, wherein each one of the sets of segmented files has a bitrate that is different than bitrates of the remaining sets of the segmented files;

generate a unique manifest for the one user, wherein the unique manifest has references to segmented files associated with (1) one of the sets of segmented files stored in one of the video recorder storage units associated with the one user, and (2) the remaining sets of segmented files stored in a storage unit other than the one of the video recorder storage units associated with the one user; and send the unique manifest to the end-user device associated with the one user.

21. The computer readable medium of claim 20, further comprising computer readable code that, when executed, causes the system to:

receive a play-back message from the end-user device of the one user, wherein the play-back message includes one of the references in the unique manifest;

use the one reference in the play-back message to retrieve a corresponding segmented file from either the one of the video recorder storage units associated with the one user or from the storage unit;

send the retrieved segmented file to the end-user device; and repeat the second receive operation, the use operation, and the second send operation to provide requested segmented files of the recorded broadcast content in a sequential manner to the end-user device.

22. The computer readable medium of claim 20, further comprising computer readable code that, when executed, causes the system to:

delete the one set of segmented files stored in the one of the video recorder storage units associated with the one user, and the remaining sets of segmented files which are stored in the storage unit.

23. The computer readable medium of claim 20, wherein:

the storage unit is a general storage unit; and wherein after receipt of the record message the store operation is started where the one of the sets of segmented files are stored in the one of the video recorder storage units associated with the one user, and when not already being stored begin to store the remaining sets of segmented files in the general storage unit.

24. The computer readable medium of claim 23, wherein the record message contains a prescheduled record request to record the broadcast content during a particular start time and end time.

25. The computer readable medium of claim 23, wherein the store operation comprises the following operations:

determine, upon receiving the record message from the end-user device of the one user, whether the broadcast content is currently being stored in the general storage unit;

based on a result of the determining operation being no, begin to store the remaining sets of segmented files of the broadcast content in the general storage unit;

after beginning to store the remaining sets of segmented files of the broadcast content in the general storage unit or based on a result of the determine operation being yes, begin to store the one of the sets of segmented files of the broadcast content in the one of the video recorder storage units associated with the one user; and after beginning to store the one of the sets of segmented files of the broadcast content in the one of the video recorder storage units associated with the one user, increment a general recording count for the broadcast content to indicate number of users recording the broadcast content.

26. The computer readable medium of claim 23, further comprising computer readable code that, when executed, causes the system to stop the store operation as follows:

determine, after an end time has been reached for recording the broadcast content for the one user, whether a general recording count is at one indicating that the one user is the only user that was recording the broadcast content;

based on a result of the determine operation being yes, stop the storing of the remaining sets of segmented files in the general storage unit;

after the stopping of the storing of the remaining sets of segmented files in the general storage unit or based on a result of the determine operation being no, stop the storing of the one of the sets of segmented files in the one of the video recorder storage units associated with the one user; and after the stopping of the storing of the one of the sets of segmented files in the one of the video recorder storage units associated with the one user, stop the generation of the unique manifest for the one user, and decrement the general recording count by one for the broadcast content.

27. The computer readable medium of claim 23, further comprising computer readable code that, when executed, causes the system to:

receive a delete message from the end-user device associated with the one user, wherein the delete message contains a request to delete the recorded broadcast content associated with the one user;

delete the unique manifest of the one user;

delete the one set of segmented files stored in the one of the video recorder storage units associated with the one user;

determine whether the one user has permission for stored segmented files in the general storage unit that none of the remaining users can access;

based on a result of the determine operating being yes, delete the stored segmented files in the general storage unit that none of the remaining users can access; and based on a result of the determine operating being no, do not delete the stored segmented files in the general storage unit that none of the remaining users can access.

28. The computer readable medium of claim 20, wherein: the storage unit is a general storage unit; and wherein before receiving the record message at least the remaining sets of segmented files are already being stored in the general storage unit, and after receiving the record message the one of the sets of segmented files are started to be stored in the one of the video recorder storage units associated with the one user.

29. The computer readable medium of claim 20, wherein the storage unit is one of the video recorder storage units which is not associated with the one user;

wherein the store operation includes storing the plurality of sets of segmented files in the one of the video recorder storage units associated with the one user and in one or more of the video recorder storage units associated with one or more other users that also requested to record the broadcast content; and wherein the computer readable medium further comprises computer readable code that, when executed, causes the system to:

after recording sessions stop for the one user and the one or more other users that requested to record the broadcast content then:

identify common segmented files that have been stored in the one of the video recorder storage units associated with the one user and in the one or more of the video recorder storage units associated with one or more other users;

determine which of the one user or the one or more other users that has longest recording session for the broadcast content;

delete all of the identified common segmented files except for the one of the sets of segmented files which are stored in the video recorder storage units associated with the one user or the one or more other users that did not have the longest recording session for the broadcast content; and the generate operation includes re-writing the unique manifest associated with the one user when the one user is not the user that has the longest recording session for the broadcast content such that the re-written unique manifest has references to segmented files associated with the one set of segmented files which are stored in the one of the video recorder storage units associated with the one user, and such that the re-written unique manifest has references to at least a portion of the identified common segmented files which are stored in the video recorder storage unit associated with the user that has the longest recording session, wherein the at least a portion of the identified common segmented files do not include the one set of segmented files which are stored in the one of the video recorder storage units associated with the one user.

* * * * *